(12) United States Patent
Chandran et al.

(10) Patent No.: US 9,741,253 B2
(45) Date of Patent: Aug. 22, 2017

(54) DISTRIBUTED AIR TRAFFIC FLOW MANAGEMENT

(71) Applicant: Resilient Ops, Inc., Winchester, MA (US)

(72) Inventors: Bala Chandran, Winchester, MA (US); Hamsa Balakrishnan, Winchester, MA (US)

(73) Assignee: Resilient Ops, Inc, Winchester, MA (US)

( * ) Notice: Subject to any disclaimer, the term of this patent is extended or adjusted under 35 U.S.C. 154(b) by 53 days.

(21) Appl. No.: 14/879,556

(22) Filed: Oct. 9, 2015

(65) Prior Publication Data

US 2016/0104383 A1 Apr. 14, 2016

Related U.S. Application Data

(60) Provisional application No. 62/062,890, filed on Oct. 12, 2014.

(51) Int. Cl.
*G08G 5/00* (2006.01)
*G06Q 10/06* (2012.01)

(52) U.S. Cl.
CPC ..... *G08G 5/0043* (2013.01); *G06Q 10/06313* (2013.01); *G08G 5/0034* (2013.01); *G08G 5/0039* (2013.01)

(58) Field of Classification Search
CPC .. G08G 5/0043; G08G 5/0034; G08G 5/0039; G06Q 10/06313
See application file for complete search history.

(56) References Cited

U.S. PATENT DOCUMENTS 6,718,236 B1 * 4/2004 Hammer ............. G08G 5/0008
 342/36
9,567,099 B2 * 2/2017 Poux ................... G08G 5/0021
(Continued)

FOREIGN PATENT DOCUMENTS

BE EP 1679651 A1 * 7/2006 ............. H02J 3/005
FR EP 1008922 A1 * 6/2000 ......... G05D 23/1923
(Continued)

OTHER PUBLICATIONS

Alison et al., "Parallelisation of Sequential Monte Carlo for real-time control in air traffic management," Year: 2013, pp. 4859-4864.*

(Continued)

*Primary Examiner* — Tuan C. To
(74) *Attorney, Agent, or Firm* — Mintz Levin Cohn Ferris Glovsky and Popeo, P.C.

(57) ABSTRACT

A price to utilize air-traffic resources is determined using a projected capacity for each air-traffic resource. The air-traffic resources include predefined geographic locations and future time periods. The price for a given air-traffic resource is based on the projected capacity of the given air-traffic resource. Data including the determined price is transmitted to each of a plurality of distributed computing systems to enable each of the distributed computing systems to independently determine, based on the price, proposed trajectories for one or more of the plurality of aerial vehicles. Data characterizing the proposed trajectories is received from the plurality of distributed computing systems. Whether the capacity required by the proposed trajectories in aggregate exceed the projected capacity for each of the plurality of air-traffic resources is determined using the proposed trajectories. Related apparatus, systems, techniques and articles are also described.

20 Claims, 12 Drawing Sheets

(56) References Cited

U.S. PATENT DOCUMENTS

| | | | | | |
|---|---|---|---|---|---|
| 2002/0072963 | A1* | 6/2002 | Jonge | ............... | G07B 15/02 705/13 |
| 2003/0055689 | A1* | 3/2003 | Block | ............... | G06Q 10/02 705/5 |
| 2003/0139875 | A1* | 7/2003 | Baiada | ............ | G08G 5/0043 701/120 |
| 2003/0139877 | A1* | 7/2003 | Dwyer | ............ | G08G 5/0034 701/467 |
| 2005/0055160 | A1* | 3/2005 | King | ............... | G01S 5/0063 701/469 |
| 2007/0245351 | A1* | 10/2007 | Sussman | ............ | G06F 9/50 718/104 |
| 2009/0105943 | A1* | 4/2009 | Ferro | ............... | G01C 23/005 701/533 |
| 2009/0289113 | A1* | 11/2009 | Vilnai | ............... | B67D 7/34 235/381 |
| 2010/0286859 | A1* | 11/2010 | Feigh | ............... | G05D 1/0044 701/25 |
| 2011/0145087 | A1* | 6/2011 | Daman | ............... | G06Q 30/08 705/26.3 |
| 2011/0208601 | A1* | 8/2011 | Ferguson | ............ | G06Q 20/18 705/16 |
| 2013/0132167 | A1* | 5/2013 | Krug | ............... | G07B 15/02 705/13 |
| 2013/0226452 | A1* | 8/2013 | Watts | ............... | G01C 21/3407 701/528 |
| 2014/0032019 | A1* | 1/2014 | Courteville | ............ | G01C 21/20 701/3 |
| 2014/0212866 | A1* | 7/2014 | Cho | ............... | G09B 5/08 434/362 |
| 2015/0073691 | A1* | 3/2015 | Mere | ............... | G05D 1/101 701/120 |
| 2015/0279217 | A1* | 10/2015 | Chen | ............ | G08G 5/003 701/123 |
| 2015/0371543 | A1* | 12/2015 | Amodio Leon | ......  | G08G 5/0034 701/528 |
| 2016/0328977 | A1* | 11/2016 | Lueck | ............... | G01C 21/00 |
| 2016/0364248 | A1* | 12/2016 | Zimmerman | ........ | G05D 1/0027 |

FOREIGN PATENT DOCUMENTS

| | | | |
|---|---|---|---|
| KR | 20010078907 A | * | 8/2001 |
| KR | 20130089936 A | * | 8/2013 |

OTHER PUBLICATIONS

Yi et al., "An air traffic prediction model based on kernel density estimation," Year: 2013, pp. 6333-6338.*

Marc et al., "Computational Air Traffic Management," Year: 2011, pp. 1B6-1-1B6-22.*

* cited by examiner

| $x_1$ | $x_2$ | | | | | |
|---|---|---|---|---|---|---|
| $\rho_1$ | $\rho_2$ | = | $z$ | | | Objective |
| 1 | | $\leq$ | 1 | | tail $\ell_1$ | At most one trajectory per tail |
| | 1 | $\leq$ | 1 | | tail $\ell_2$ | |
| 1 | | $\leq$ | 30 | | $s_1$, 9:05-9:10 | |
| 1 | | $\leq$ | 30 | | $s_1$, 9:10-9:15 | |
| | 1 | $\leq$ | 40 | | $s_1$, 9:15-9:20 | |
| | 1 | $\leq$ | 40 | | $s_1$, 9:20-9:25 | |
| | 1 | $\leq$ | 40 | | $s_2$, 9:00-9:05 | Sector capacity |
| | 1 | $\leq$ | 10 | | $s_2$, 9:05-9:10 | |
| | 1 | $\leq$ | 10 | | $s_2$, 9:10-9:15 | |
| 1 | | $\leq$ | 20 | | $s_2$, 9:15-9:20 | |
| 1 | | $\leq$ | 20 | | $s_2$, 9:20-9:25 | |
| 1 | | $\leq$ | 20 | | $s_2$, 9:25-9:30 | |
| 1 | 2 | $\leq$ | (100/12) | | $r$, 9:15, segment $j_1$ | Node capacity |
| 2 | 1 | $\leq$ | (80/12) | | $r$, 9:15, segment $j_2$ | |

*FIG. 9*

```
   Input: A space-time-scenario network
   Output: A maximum-weight STS-forest
0  begin
1      Initialize labels of all nodes based on Equations (19) and (20)
2      Set status of all scenarios in scenario tree to 0.
3      while status of root of scenario tree is 0 do
4          Get scenario farthest from the root with status 0
5          Compute labels of the Type 2 nodes in the scenario using Equation (16)
6          for each time period t from scenario end to scenario start do
7              Compute labels of Type 1 nodes in time period t of the scenario using Eqn. (17) and (18)
8          end for
9          Set status of scenario to 1
10     end while
11     Return the weight of forest as sum of labels of the tail's origin nodes.
12 end
```

*FIG. 12*

DISTRIBUTED AIR TRAFFIC FLOW MANAGEMENT

RELATED APPLICATION

This application claims priority under 35 U.S.C. §119(e) to U.S. Provisional Patent Application No. 62/062,890 filed Oct. 12, 2014, the entire content of which is hereby incorporated by reference herein.

TECHNICAL FIELD

The subject matter described herein relates to air traffic flow management, for example, in the presence of uncertainty through coordination of trajectories of aircraft.

BACKGROUND

Air traffic flow management (ATFM) is the regulation of air traffic in order to avoid exceeding airport, airspace, or air traffic control capacity in handling traffic, and to ensure that available capacity is used efficiently. Because only one aircraft can land or depart from a runway at a given time, and because aircraft must be separated by time to avoid collisions, every airport has a finite capacity (i.e., airports can safely handle only so many aircraft per hour). This capacity depends on many factors, such as the number of runways available, layout of taxi tracks, availability of air traffic control, and current or anticipated weather. Weather can cause large variations in capacity because strong winds may limit the number of runways available, and poor visibility may necessitate increases in separation between aircraft. Similarly, there are limits on the number of aircraft that can flow through navigational fixes in the en-route airspace, as well as limits on the number of aircraft that can exist in a given region of airspace (called sectors) at any given time. The latter is driven by limits on the number of aircraft an air traffic controller can safely handle simultaneously. Air traffic control can also be limiting, there are only so many aircraft an air traffic control unit can safely handle. Staff shortages, radar maintenance or equipment faults can lower capacity.

When capacity of a resource becomes insufficient (for example, due to weather or poor planning), aircraft may be directed towards holding patterns where they circle until it is their turn to land or are instructed to wait on ground. But aircraft flying in circles and waiting on the tarmac of an airport are inefficient and costly ways of delaying aircraft. It is more efficient to plan and account for uncertainty in capacity so that resources are fully utilized without (or with lower probability of) exceeding capacity.

SUMMARY

In an aspect, a price to utilize each of a plurality of air-traffic resources is first determined using data characterizing a projected capacity for each of a plurality of air-traffic resources. The plurality of air-traffic resources includes predefined geographic locations and future time periods designated as available for use. The projected capacity for each of the plurality of air-traffic resources characterizing a maximum number of aerial vehicles allowed to utilize the air-traffic resource as a function of time. The price for a given air-traffic resource based on the projected capacity of the given air-traffic resource. Data including the determined price is transmitted to each of a plurality of distributed computing systems to enable each of the distributed computing systems to independently determine, based on the price, proposed trajectories for one or more of the plurality of aerial vehicles. Data characterizing the proposed trajectories is received from the plurality of distributed computing systems. Whether the capacity required by the proposed trajectories in aggregate exceed the projected capacity for each of the plurality of air-traffic resources is determined using the proposed trajectories. An updated price to utilize each of the plurality of air-traffic resources is determined. The updated price for at least one of the air-traffic resources increasing when the proposed trajectories in combination exceed the projected capacity of the at least one of the air-traffic resources. Data including the determined updated price is transmitted to each of the plurality of distributed computing systems to enable each of the distributed computing systems to independently determine, based on the updated price, updated proposed trajectories for one or more of the plurality of aerial vehicles. One or more of determining, transmitting, and receiving, are performed using at least one data processor.

One or more of the following features can be included in any feasible combination. For example, each proposed trajectory can be determined by one of the plurality of distributed data processors independently from other trajectories. Whether the proposed trajectories satisfy a criterion characterizing an optimal solution can be determined. In an iterative manner, the updated price can be determined, the updated price can be transmitted to the plurality of the distributed computing systems, and the proposed trajectories can be received until the proposed trajectories satisfy the criterion or until execution of a predetermined number of iterations.

An uncertainty in capacity as a function of time can be associated with each air-traffic resource. The uncertainty in capacity can characterize a variability of the maximum number of aerial vehicles allowed to utilize the air-traffic resource as a function of time. A scenario tree characterizing possible scenarios and a likelihood of each of the possible scenarios occurring can be generated using the uncertainty in capacity for each air-traffic resource. Each of the possible scenarios can describe potential future capacity of the air-traffic resources according to a realization of uncertainty. The potential future capacity can be of the air-traffic resources for the predefined geographic locations and the future time periods. The price can be determined for each air-traffic resource and each scenario in the scenario tree. A trajectory tree characterizing multiple possible geographic locations of one of the plurality of aerial vehicles at each of the future time periods corresponding to each possible scenario can be received from each of the plurality of distributed computing systems. The trajectory tree can further characterize actions for the one of the plurality of aerial vehicles to perform according to the realization of uncertainty. The uncertainty in capacity as a function of time can be determined based on data received from an external source. The data includes one or more of weather observations, weather forecasts, flight schedules, flight statuses, operational constraints, traffic management initiatives, and initial flight plans.

The plurality of air-traffic resources can be represented by nodes, arcs, and sectors. The nodes can correspond to a region in airspace or a decision point. The arcs can connect nodes and correspond to a positive minimum transit time, maximum transit time, and cost as a function of transit time. Each sector can correspond to a contiguous region of airspace and fully including one or more arcs.

The price can be a non-monetary characterization of an over-utilization or an under-utilization of a given air-traffic resource.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 9 illustrates matrix representation of illustrative mathematical program formulation for a five-minute discretization;

FIG. 12 illustrates pseudocode for an example dynamic programming procedure to calculate the maximum weight STS-forest.

Like reference symbols in the various drawings indicate like elements.

DETAILED DESCRIPTION

Figure 1:
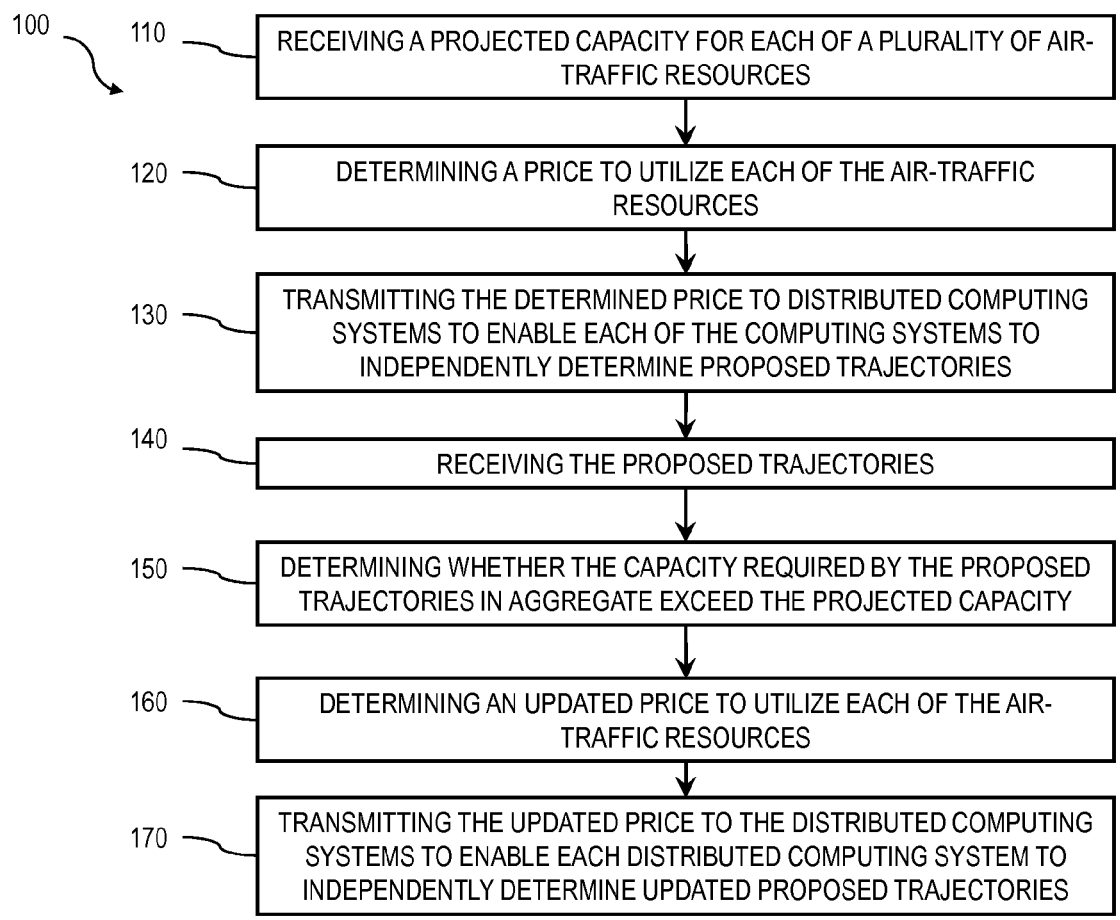
FIG. 1 is a process flow diagram illustrating a method for computing optimal trajectories of a large number of aircraft given resource capacity constraints in the air and on the ground.

The current subject matter relates to computing optimal trajectories of a large number of aircraft given resource capacity constraints in the air and on the ground and can include accounting for uncertainty in future predicted capacities.

The current subject matter can include computing optimal origin-to-destination trajectories in space and time of a large number of aerial vehicles (also referred to as aircraft) in the face of uncertain capacity on the ground (such as airports, runways, ramp areas, and the like) as well as in the air (en-route airspace including sectors, waypoints, fixes, and the like). Some implementations utilize a distributed computing architecture in which information is iteratively exchanged between a set of distributed nodes/processors and a central node/processor until an optimal solution or near optimal solution is obtained. The current subject matter can produce trajectories for all aircraft in the system that optimizes the total system-wide cost/benefit.

Each distributed node can be responsible for computing a trajectory for one or more aircraft in the system given the "price" of using a constrained resource on the ground or in the air at a certain time. (The term "price" is used in the sense of a numerical signal and not necessarily in the monetary sense (e.g., of a dollar value).) Each distributed node can compute trajectories of their respective aircraft independent of other nodes, and return these trajectories as proposed trajectories to the master node. The master node then evaluates the proposed trajectories of all the aircraft in the system (as received from all distributed nodes) and assesses optimality of the proposed trajectories in aggregate across the entire system. If the proposed trajectories in aggregate are not feasible and/or an optimality criterion has not been achieved by the proposed trajectories, the master node updates and re-issues the updated "price" to the distributed nodes. As an example, the "price" for a given resource may increase if the proposed trajectories over-utilize the resource (e.g., there is high demand) while the "price" for another resource may decrease if the proposed trajectories under-utilize the resource (e.g., there is low demand). The distributed nodes use the updated price to re-compute the proposed trajectories. The process can iterate until a feasible set of proposed trajectories and/or a stopping criterion is reached.

The distributed nature of the current subject matter can allow each node to determine proposed trajectories for their respective aircraft using different and independent criteria. This can be advantageous, for example, because airline operators (e.g., airlines) may value use of a given resource (e.g., a specific location and time) differently than one another for example, based on business considerations. Thus different nodes may compute differently and independently from one another the proposed trajectories for their respective aircraft. Moreover, the distributed nature of the current subject matter provides for distributed computing, which can distribute the computational load across a large number of parallel computation systems or processors, which enables computation of optimal or near optimal solutions (e.g., the proposed trajectories in aggregate satisfy an optimality criterion) with low run-times.

FIG. 1 is a process flow diagram illustrating a method 100 for computing optimal trajectories of a large number of aircraft given resource capacity constraints in the air and on the ground. The master node may perform the computation.

At 110, data is received characterizing a projected capacity for each air-traffic resource in the air-traffic network. Air-traffic resources can include predefined geographic locations and future times the air-traffic resource is designated as available for use. For example, air-traffic resources can include airports, runways, ramp areas, and airspaces (which may include regions defined by altitude, latitude, longitude, and the like). Air-traffic resources can be represented by sectors, waypoints, fixes, and the like. The capacity for each air-traffic resource can characterize a maximum number of aerial vehicles allowed to utilize the air-traffic resource as a function of time. In an example implementation, capacity can take on two forms: (1) "density" constraint specifying that the number of aircraft in a given region of airspace cannot exceed some number; and (2) "throughput" constraint specifying that the number of aircraft passing through some resource cannot exceed some rate (e.g., no more than 30 aircraft landing at a runway per hour).

At 120, a price to utilize each of the air-traffic resources can be determined. The price for a given air-traffic resource can be based on the projected capacity of the given air-traffic resource. For example, if the projected capacity is relatively low, then the price can be high. If the projected capacity is relatively high, then the price can be low. In addition, the price can be based on the projected capacity and estimated demand. It is contemplated that the price may not be monetary but can be a non-monetary characterization of an over-utilization or an under-utilization of a given air-traffic resource. The price can be considered the marginal value of the resource at capacity and may be referred to as "Marginal Cost"; "multiplier"; and/or "dual".

At 130, the determined price can be transmitted to multiple distributed computing systems to enable each of the distributed computing systems to independently determine, based on the price, proposed trajectories for one or more associated aerial vehicles. A proposed trajectory can include a complete description of the route and actions that an aircraft should take in space and time under all forecasted capacity conditions. The distributed computing systems may be remote (e.g., over a network) from one another and/or separate data processors.

Each distributed computing system can compute a proposed trajectory for one or more aerial vehicles. The distributed computing systems may determine an optimal trajectory (or set of optimal trajectories) for the aerial vehicle (or set of aerial vehicles) given the price of resources. The distributed computing systems in aggregate can compute a trajectory for each aerial vehicle in the network and thus all aerial vehicles in the network will have a determined trajectory.

The distributed computing system can determine the proposed trajectories independently. In other words, communication or data exchange between distributed computing systems need not occur for the distributed computing systems to compute their respective trajectories. This allows the processing to scale efficiently and easily (e.g., only need to add additional distributed computing systems to improve run-time performance or increase the number of aerial vehicles in the network). In addition, this enables the distributed computing systems to compute trajectories (using the price) according to different objectives (e.g., different specifications of optimality). Moreover, the objectives used by a given distributed computing system need not be disclosed to or known by other distributed computing systems.

At 140, the proposed trajectories can be received from the distributed computing systems.

At 150, whether the capacity required by the proposed trajectories in aggregate exceed the projected capacity for each of the air-traffic resources is determined. If the proposed trajectories in aggregate do not exceed the projected capacity, the proposed trajectories may be a viable solution, although they may be sub-optimal (as measured according to an optimality criterion characterizing an optimal solution, which may be determined) and further processing and iterating may be performed to improve upon the solution. If projected capacity is exceeded by the proposed trajectories in aggregate, the proposed trajectories are not feasible and would likely result in an aerial vehicle being delayed (e.g., in the air or at an airport). As an example of the proposed trajectories exceeding projected capacity, if five proposed trajectories require use of a given a runway between 9 AM and 9:15 AM but the runway has a maximum projected capacity of three aircraft between 9 AM and 9:15 AM, then the proposed trajectories in aggregate exceed the projected maximum capacity.

When the proposed trajectories are not feasible and/or the proposed trajectories do not satisfy a criterion of optimality, at 160, an updated price can be determined to utilize each of the air-traffic resources in the network. The updated price can be determined such that the price of a given air-traffic resource increases when the proposed trajectories in aggregate (e.g., combination) exceed the projected capacity of the given air-traffic resource. The updated price can be calculated based on the delay impact of the resources. For example, two resources with similar demand and capacity may have different prices based on the downstream impacts of the delay they cause. Downstream impact may be determined according to a modeling of the network for example, using a scenario tree to compute how the network would compensate for a delay.

At 170, the updated price can be transmitted to the distributed computing systems to enable each of the distributed computing systems to independently determine, based on the updated price, updated proposed trajectories for one or more aerial vehicles.

In some implementations, the process may iterate through determining an updated price, transmitting the updated price to the distributed computing systems, and receiving proposed trajectories. The iterating may occur until a criterion of optimality is satisfied (e.g., a measure of how "good" the solution is) or until execution of a predetermined number of iterations. At each iteration, a bound or measure of how far the current solution is from optimal can be computed and used with the stopping criterion to determine whether to further iterate.

In some implementations, the current subject matter can handle uncertainty in capacity as a function of time. Capacity may vary over time due to, for example, weather, and other conditions. "Uncertainty" can be described by a set of scenarios that can unfold, each with an associated probability. For example, "the runway capacity from 9 AM to 10 AM can be 30 aircraft an hour with probability 0.8 and 20 aircraft with probability 0.2". Each scenario then can branch into sub-scenarios as time progresses and the uncertainty is realized.

Figure 2:
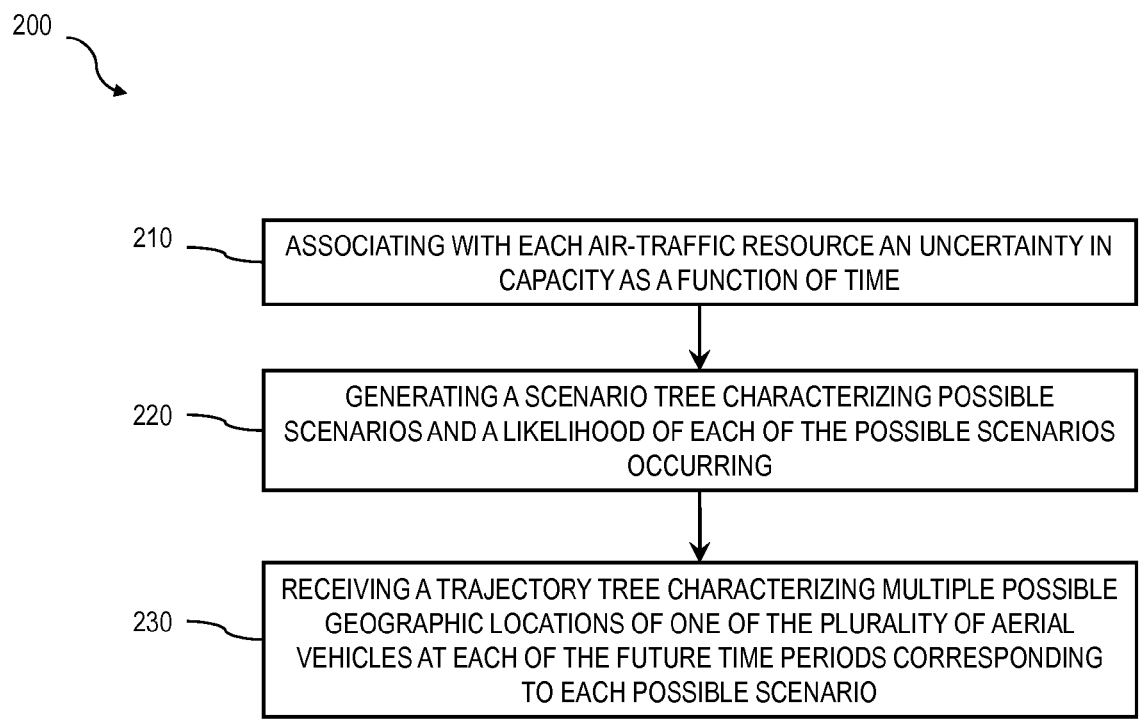
FIG. 2 is a process flow diagram illustrating a method of computing optimal trajectories of a large number of aircraft given resource capacity constraints while taking into account varying levels of uncertainty.

FIG. 2 is a process flow diagram illustrating a method 200 of computing optimal trajectories of a large number of aircraft given resource capacity constraints while taking into account varying levels of uncertainty.

At 210, an uncertainty in capacity as a function of time can be associated with each air-traffic resource. The uncertainty in capacity can characterize a variability of the maximum number of aerial vehicles allowed to utilize the air-traffic resource as a function of time. In some implementations, the uncertainty in capacity as a function of time can be determined based on data received from an external source. The data can include, for example, weather observations, weather forecasts, flight schedules, flight statuses, operational constraints, traffic management initiatives, and initial flight plans.

At 220 a scenario tree can be generated using the uncertainty in capacity for each air-traffic resource. The scenario tree can characterize possible scenarios and a likelihood of each of the possible scenarios occurring. Each of the possible scenarios can describe potential future capacity of the air-traffic resources according to a realization of the uncertainty. For example, "the runway capacity from 9 AM to 10AM can be 30 aircraft an hour with probability 0.8 and 20 aircraft with probability 0.2". The potential future capacity can be of the air-traffic resources for the predefined geographic locations and the future times.

A price can be determined for each resource, time, and scenario in the corresponding scenario tree. Thus each resource has a different determined price for each possible scenario of a resource. In other words, price can vary by resource, scenario, and time. An example of a scenario tree is discussed below with reference to FIG. 7. The scenario tree and price may be transmitted to the distributed computing systems for computation of proposed trajectories.

In order to handle uncertainty, a "trajectory" can, in addition to including a complete description of the route that an aircraft should take in space and time, include a complete description of the route that the aircraft should take under all forecasted capacity conditions. In some implementations, trajectories, when dealing with uncertainty in capacity, may take the form of a trajectory tree characterizing multiple possible geographic locations of the plurality of aerial vehicles at each of the future time periods corresponding to each possible scenario. The trajectory tree can characterize actions for the aerial vehicles to perform according to the realization of uncertainty. Thus, trajectories can include more than a set of points in space and time; they can include a set of points in space, time, and uncertainty (for example, a trajectory of an aircraft can characterize "if capacity scenario X materializes at time $t_1$, then perform actions A and B, but if capacity scenario Y materializes at time $t_2$, perform actions C and D").

At 230, trajectory trees can be received from the distributed computing systems. The trajectory trees can be evaluated to determine whether the trajectory trees, in aggregate, exceed the expected capacity at any possible scenario. If they do, then the process can iterate (determine updated price, transmit to distributed computing systems to determine updated proposed trajectory trees, and receive the proposed trajectory trees) until a viable solution is found. The process may also iterate until a measure of optimality is satisfied or a predetermined number of iterations have executed.

The subject matter described herein can rely on additional information in order to make determinations. For example, the current subject matter can rely on aircraft schedules (origin, destination, and time windows in which they are allowed to take off and land), aircraft operational capabilities (what maneuvers an aircraft is capable of), cost/benefit information (cost of each maneuver, cost of delay, cost of cancellation, revenue), connectivity information (if an aircraft performs multiple flight legs, the current subject matter can account for the cascading nature of delays and its impact on downstream flights), and capacity scenarios.

FIGS. 3-12 illustrate details of an example implementation of the current subject matter.

Figure 3:
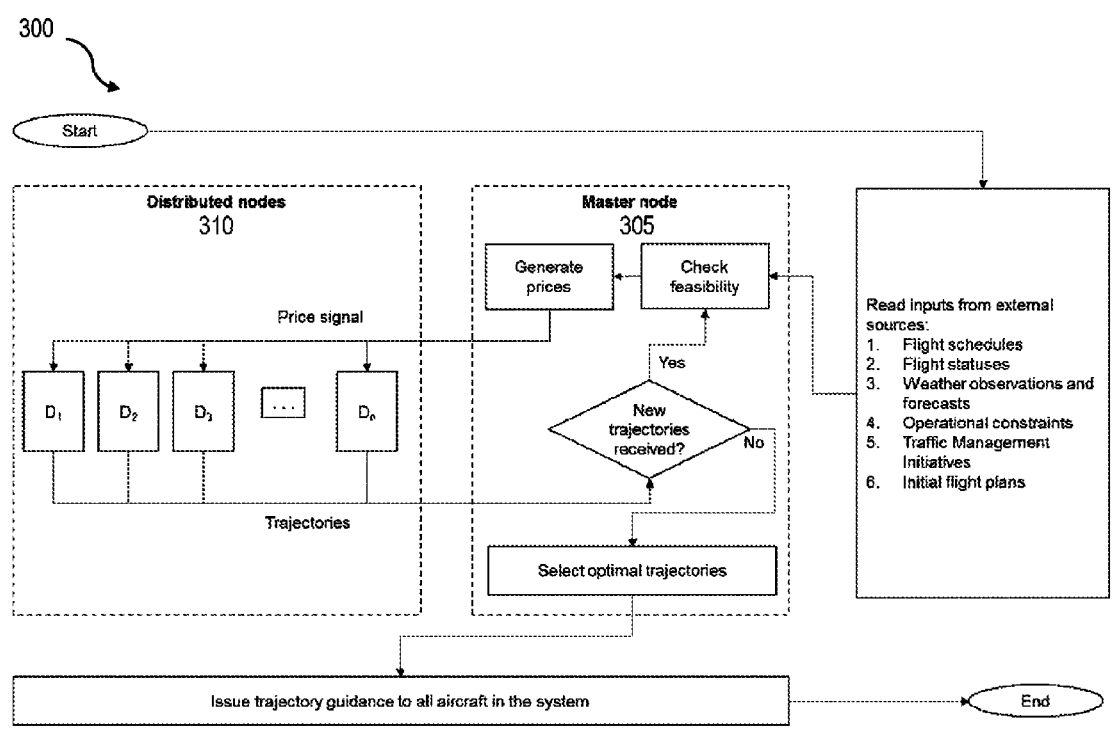
FIG. 3 is an example functional block diagram illustrating a system at a high level, including components and data flow.

FIG. 3 is an example functional block diagram illustrating a system 300 at a high level, including components and data flow. The system 300 includes a master node and distributed nodes 310. As described below, the computations performed by the distributed nodes 310 are henceforth referred to as the "subproblem" and those performed by the master node 305 are referred to as the "master problem". The following provides a detailed description of example algorithms.

Figure 4:
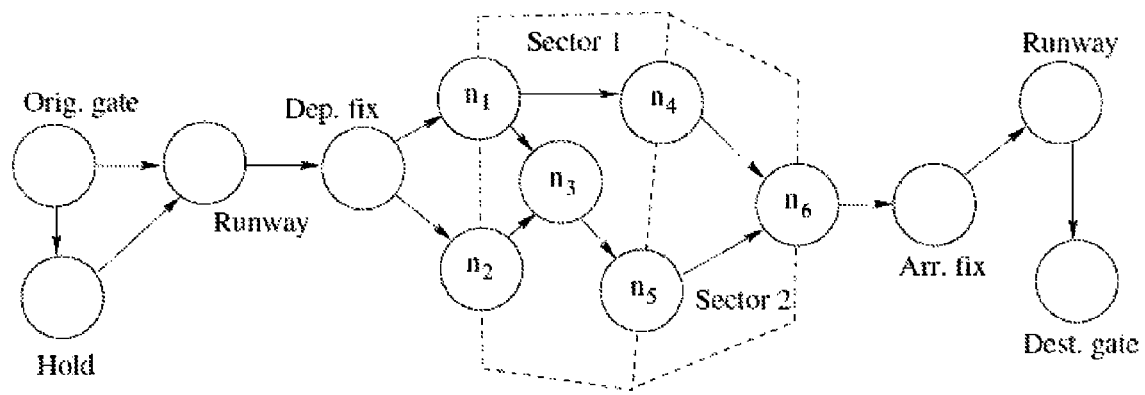
FIG. 4 is a graph illustrating Network representation of the ATFM problem.

With respect to model notation, the problem can be represented by a standard node-link network along which aircraft are routed. The model can include a node, an arc, a sector, a tail, a flight, and a trajectory, as illustrated in FIG. 4. A node can be either a physical location, corresponding to a region in the airspace, or a decision point. For example, in FIG. 4, the "Hold" node represents a decision to hold an aircraft at the origin gate and not a physical movement of the aircraft, whereas the "Dep. fix" node is a physical location that the aircraft passes through.

An arc is a directed segment connecting two nodes. It is associated with a strictly positive minimum transit time, maximum transit time, and cost as a function of transit time. A sector is a contiguous region of airspace. An arc is required to be fully contained within a sector (i.e., it cannot cross sector boundaries); therefore a sector could be viewed as a collection of arcs. Nodes are introduced at the sector boundaries to ensure that arcs do not cross sectors, although a node could be present in the interior of a sector.

A tail refers to a physical aircraft that moves from one location to another. A flight is an operation of an aircraft from an origin to the destination; a tail may consist of multiple flights over a time horizon. For a given tail, the destination airport of a flight must be the origin airport of the successor/connecting flight. Each flight is associated with a set of arcs that form the network along which that aircraft can be routed from its origin to destination. The parameters of the arcs (minimum and maximum transit times and cost) are flight-specific.

A trajectory or "4D-trajectory", for this particular example implementation, is a sequence of node-time combinations that represent the flight path of an aircraft. It implicitly specifies the arcs along the path and the transit times on those arcs.

Figure 5:
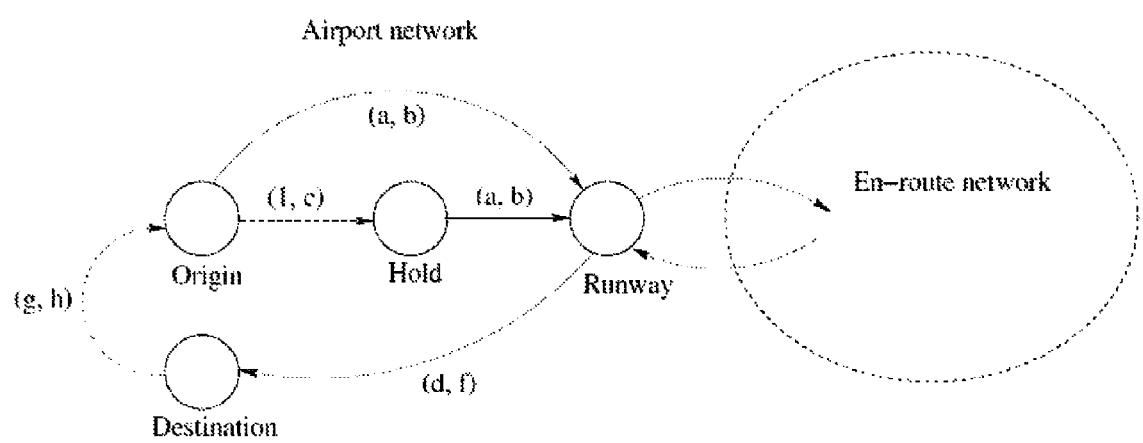
FIG. 5 is a graph illustrating a network representation of an airport, in which values in parentheses represent the minimum and maximum transit times on each arc and Physical movement of aircraft occur on arcs with solid lines.
Figure 6:
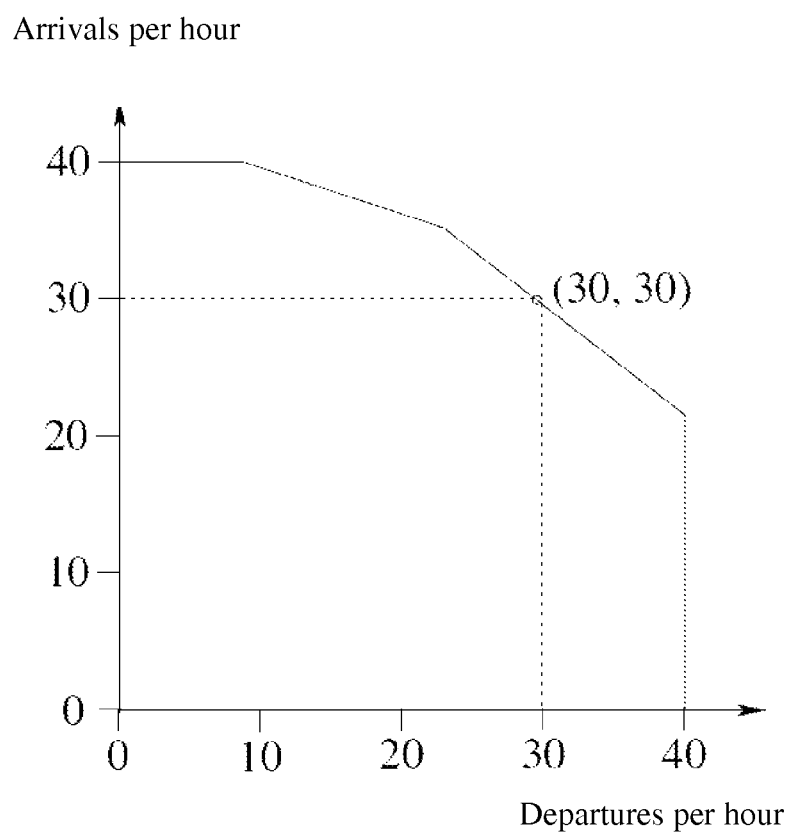
FIG. 6 is an example of runway capacity envelope with four segments.

The network model of an airport includes an origin node (which could be viewed as the gate), represented by the "Origin" node in FIG. 5. From the origin node, the aircraft can proceed to the departure runway with minimum and maximum taxi times of a and b respectively. Note that this arc implies that the aircraft leaves the gate and any delay is accrued on the surface of the airport after pushback. The second option available at the gate is to hold the airport for at least 1 time unit and up to c time units (the minimum hold cannot be zero since otherwise it would be equivalent to the direct arc to the runway). If the aircraft is held, it "proceeds" to the gate node (although this is not a physical movement of the aircraft) and then to the runway with the same minimum and maximum times of a and b as before. The aircraft then leaves the airport at the runway and enters the en-route network until it gets to its destination.

At the arrival airport, an aircraft arrives at the runway, and then taxis to the gate with minimum and maximum transit times of d and f respectively. If the aircraft is continuing on to a next flight, it "travels" from the destination node to the origin node with a minimum transit time equal to transit time h, which is the minimum time that must elapse between a flight arriving at its destination gate and the time that successor flight is able to leave the gate. Instead of a single runway node, the model can alternatively consist of independent departure and arrival runways.

With regards to constraints, there are two types of constraints that are imposed in the model, operational constraints and capacity constraints. Operational constraints are flight-specific and specify what actions may be performed by a flight. They include minimum and maximum transit times on arcs, maximum ground and air delay, minimum turnaround time between successive flights, and altitude and routing restrictions, which are imposed by limiting the set of arcs that a flight can use. The feasible actions vary by aircraft performance characteristics such as the nominal speed and altitude.

Capacity constraints represent aggregate limits on flows in the network. There are two types of capacity constraints, sector capacity constraints and node throughput constraints. Sector capacity constraints limit the number of aircraft that can be in a sector at any time, and are driven by the geometry of the sector as well as air traffic controller workload. On the surface, the taxi arcs (represented by the solid lines in FIG. 5 collectively form the "surface" sector, and it is possible to apply a limit on the number of aircraft that are on the surface at any time. Such constraints may be necessary in order to avoid surface gridlock during extreme events.

Node throughput constraints limit the flow through a node at any time. For example, miles-in-trail and minutes-in-trail constraints stipulate the minimum spacing between two aircraft; if there is a spacing requirement of 2 minutes between successive aircraft, it translates to a node throughput of 30 aircraft per hour.

The throughput constraints at some nodes, such as runways, are more complex since different types of operations (departures and arrivals) can occur at them. In that case, the node throughput constraint at any time is represented by a capacity envelope composed of segments that specify the tradeoff between arrival and departure operations. For example, the envelope shown in FIG. 6 stipulates that if the runway is in a "departures-only" or "arrivals-only" operating mode, the limit on the number of operations is 40 per hour. However, in the case of mixed (arrival and departure) operations, the throughput may be higher. For instance, the runway is capable of handling 30 arrivals and 30 departures per hour. Since envelopes are typically convex, the individual segments can be modeled as independent constraints, the intersection of which forms the capacity envelope.

With regards to capacity uncertainty, both airport and sector capacity depend on the weather conditions such as the visibility, cloud ceiling and the location of thunderstorms, and are therefore prone to uncertainty.

Figure 7:
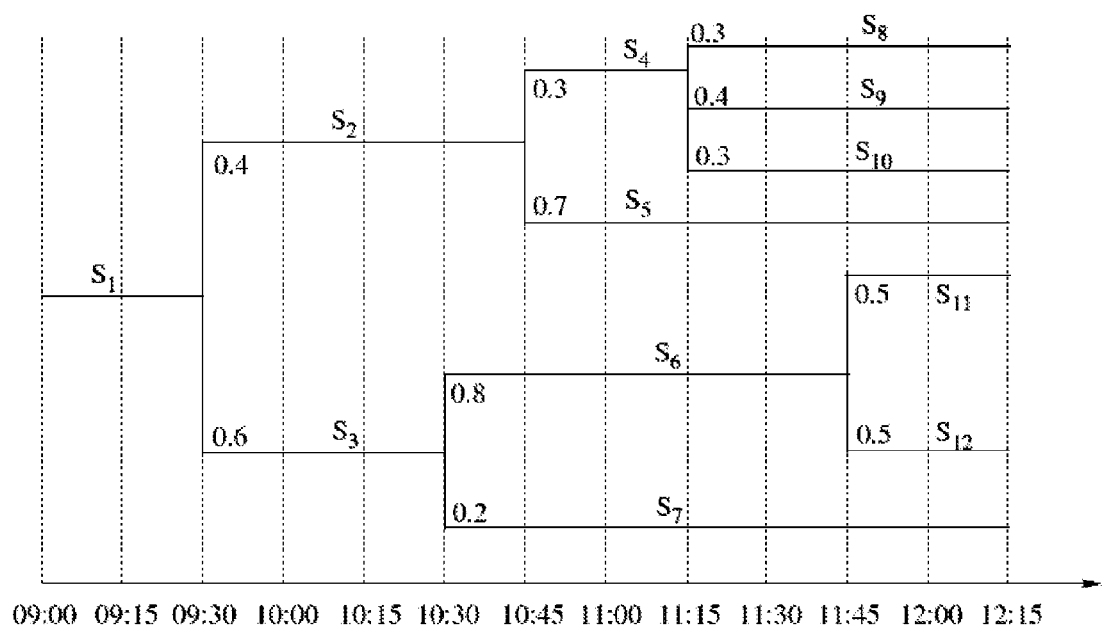
FIG. 7 illustrates an example of a scenario tree with 12 scenarios.

Similar to the representation of uncertainty in Ground Delay Programs, capacity uncertainty is represented using scenario trees, an example of which is shown in FIG. 7. In the example, scenario $S_1$ starts at 9 AM. At 9:30, scenario $S_2$ materializes with probability 0.4 and scenario $S_3$ with probability 0.6. If scenario $S_2$ materializes, then at 10:45 AM, scenario $S_4$ occurs with probability 0.3 and scenario $S_5$ with probability 0.7, and so on. The capacity of a sector or a node during a scenario is represented by its profile, which specifies the capacity or envelope at each time during duration of the scenario. When henceforth a scenario is referred to, it could be the synthesis of several independent scenario trees corresponding to different storm systems in different parts of the country.

When solving for the route for an aircraft in the presence of a scenario tree, the solution for an aircraft is a trajectory for each scenario that could unfold; such a set of trajectories is called a trajectory tree. The trajectory tree specifies the location of the aircraft at each time during a scenario and conditional statements on what actions to perform as each new scenario unfolds. For example, the trajectory tree for an aircraft given the scenario tree in FIG. 7 might be "Leave the gate at 9:05, arrive at the runway at 9:15, arrive at the departure fix at 9:30; if scenario $S_2$ materializes, proceed toward $n_1$ and arrive at 9:45, else if scenario $S_3$ materializes, proceed toward $n_2$ and arrive at 10:05," and so on. The trajectory tree satisfies the "coupling constraint" that any decision can be based only on information that is available at the time that the decision is made, i.e., only on scenarios that have materialized up until that point.

With regard to time-discretization, the time horizon is discretized in the mathematical formulation of the problem, implying that all transit times in the network are integer multiples of the time period, and all operations occur at a set of periodic epochs.

The deterministic problem is stated as follows: given a set of flights (and associated tails), and airport and airspace capacity constraints, identify a 4D-trajectory tree for each flight that maximizes the system-wide benefit (revenue plus cancellation penalty) minus costs (operating costs plus delay costs), and that obeys operational and capacity constraints for all time periods.

The stochastic problem statement is as follows: given a set of flights (and associated tails), a scenario tree and capacity profiles, identify a trajectory tree for each tail that maximizes the system-wide expected benefit (revenue plus cancellation penalty) minus expected costs (operating costs plus delay costs), and that obeys operational and capacity constraints for all time periods in all scenarios.

Although the deterministic TFMP is a special case of the stochastic problem in which the scenario tree has only one scenario with probability 1, it is described as separate problem for purposes of clarity of description.

With regard to Deterministic Traffic Flow Management, by contrast to prior models of the deterministic TFMP, rerouting in the model is not restricted to an enumerated set of simple paths from the origin to the destination, restricted to an acyclic network, or limited in geographical scope. Instead, the model allows route choices on a significantly larger network, with no restrictions on the network structure. The mathematical model is described here in detail, using the following notation.

The mathematical model is described here in detail, using the following notation.

F Set of flights.
L Set of tails.
$l_f$ The tail of flight f.
S Set of sectors.
T Set of time periods in the time horizon.
N Set of nodes in the network.
A Set of arcs in the network. An arc a∈A is defined by its start and termination nodes $n_1$ and $n_2$ as $a=(n_1, n_2)$, referred to as the head and tail of the arc respectively.
$A_F(f)$ Set of arcs that can be used by flight f∈T.
$A_N(n)$ Set of arcs with head node n∈N, also referred to as the "outgoing" arcs from node n.
$A_S(s)$ Set of arcs in sector s∈S.
$s_a$ Sector of arc a.
R Set of all feasible 4D-trajectories, where a 4D-trajectory specifies the routing in space and time of a tail, and not that of a single flight. Specifying the trajectory implicitly specifies the tail. A trajectory need not include all flights for a tail. It could contain only the 4D-trajectory for an aircraft from its first flight until the first flight cancellation, and all flights with no trajectory (the first cancelled flight and all subsequent connections) are considered cancelled.

$R_L(l)$ The set of trajectories for tail l.

P(a,t) The number of aircraft on arc a∈A at time t∈T.

Q(a,t) The number of aircraft that enter arc a∈A at time t∈T.

J(n,t) The set of segments in the capacity envelope of node n at time t.

$\rho_r$ The benefit (revenue plus cancellation penalties) minus costs (operating plus delay) of trajectory r∈R.

$R_f$ The benefit (revenue plus cancellation penalties) minus costs (operating plus delay) of flight f∈T.

With regards to intersections between a trajectory and sector capacity constraint, sector capacity constraints limit the total number of aircraft in a sector, which can be written as $$\sum_{a \in A_S(s)} P(a, t) \le B_{s,t} \; \forall s \in S, t \in \mathcal{T} \quad (1)$$

where $B_{s,t}$ is the capacity of sector s at time t.

A trajectory r∈R is said to intersect with a sector capacity constraint for sector s at time t if the trajectory results in an aircraft being present in sector s at time t. A trajectory can intersect with at most one sector capacity constraint at any time (in the deterministic case). The set of trajectories that intersect with a capacity constraint representing sector s at time t is denoted by $R_S(s,t)$.

With regards to intersection between a trajectory and node capacity constraint, node capacity constraints limit the throughput of aircraft through a node. Although the node capacity envelope at a certain time could consist of multiple segments, each segment is treated as an independent constraint, as the intersection of all segments at a certain time defines the envelope. Therefore, when a node constraint is referred to, one segment j∈J(n,t) of the envelope of a node n at time t is referred to. The node throughput constraint is linear, and is written as $$\sum_{a \in A_N(s)} \sigma_{a,t,j} Q(a, t) \le D_{n,t,j} \quad (2)$$

$$\forall n \in \mathcal{N}, t \in \mathcal{T}, j \in \mathcal{J}(n, t)$$

where σ and D are constants that define the shape of the segment.

A trajectory r∈R is said to intersect with a node capacity constraint for node n at time t if the trajectory results in an aircraft entering an outgoing arc of node n at time t (i.e., the aircraft passes through node n at time t). The set of trajectories that intersect with a node capacity constraint representing envelope segment j of node n at time t is denoted by $R_N(n,t,j)$.

To summarize, the following additional notation is introduced:

$B_{s,t}$ The capacity of sector s at time t.

$D_{n,t,j}$ The right-hand-side of the linear constraint representing segment j of the capacity envelope for node n at time t.

$a_{r,t}$ The arc that an aircraft following trajectory r is on at time t. (This arc is unique since the current discussion deals only with the deterministic case with one scenario).

$\sigma_{a,t,j}$ The coefficient of arc a in the linear constraint representing segment j of the capacity envelope for the head node of arc a at time t $R_L(l)$ The set of trajectories of tail l.

$R_S(s,t)$ The set of trajectories that intersect with sector capacity constraint of sector s at time t.

$R_N(n,t,j)$ The set of trajectories that intersect with segment j of the capacity envelope for node n at time t.

The traditional formulation of the TFMP has capacity and operational constraints, with binary decision variables that indicate whether a flight has reached a sector by a certain time period. By contrast, the present formulation has only capacity constraints, and all the other constraints (minimum and maximum transit times, flight connectivity, turnaround times, etc.) are absorbed into the definition of the variable. This formulation results in fewer constraints but an exponentially greater number of variables. The decision variables are defined as follows:

$$x_r = \begin{cases} 1 & \text{if trajectory } r \text{ is chosen, and} \\ 0 & \text{otherwise} \end{cases} \quad (3)$$

$$\forall r \in \mathcal{R}$$

The Integer Master Problem (IMP) may now be stated as follows.

$$\text{maximize } z = \sum_{r \in \mathcal{R}} \rho_r x_r \quad (4)$$

$$(IMP) \text{ s.t.} \sum_{r \in \mathcal{R}_L(l)} x_r \le 1 \quad (5)$$

$$\forall l \in \mathcal{L}$$

$$\sum_{r \in \mathcal{R}_S(s,t)} x_r \le B_{s,t} \quad (6)$$

$$\forall s \in \mathcal{S}, t \in \mathcal{T}$$

$$\sum_{r \in \mathcal{R}_N(n,t,j)} \sigma_{a_{r,t},t,j} x_r \le D_{n,t,j} \quad (7)$$

$$\forall n \in \mathcal{N}, t \in \mathcal{T}, j \in \mathcal{J}(n, t)$$

$$x_r \in \{0, 1\} \forall r \in \mathcal{R} \quad (8)$$

Objective (4) maximizes the total benefit minus cost of all trajectories selected. Constraint (5) states that at most one trajectory may be selected for each tail. Constraints (6) and (7) are the sector and node capacity constraints respectively.

Figure 8:
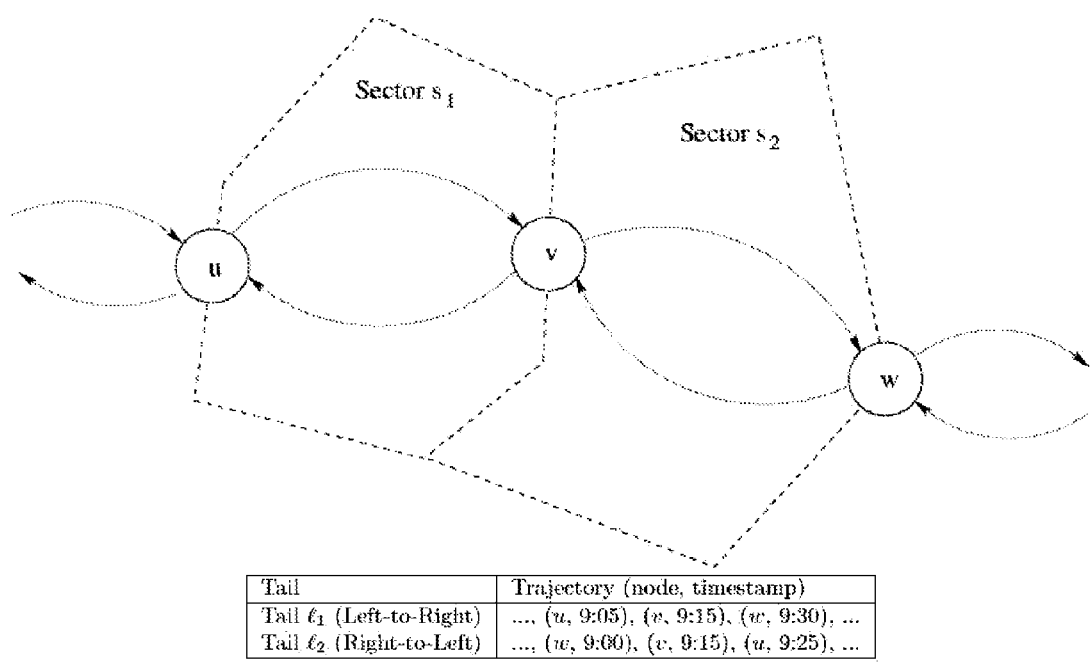
FIG. 8 illustrates an example for the mathematical formulation of an example of the current subject matter.

Consider two tails $l_1$ and $l_2$ going Left-to-Right and Right-to-Left respectively, as shown in FIG. 8. Let the capacity of sector $s_1$ be 30 aircraft from 9:00 to 9:15 and 40 aircraft from 9:15 to 9:30, and the capacity of sector $s_2$ be 10 aircraft from 9:00 to 9:15 and 20 aircraft from 9:15 to 9:30. Let the node capacity envelope be represented by two segments Segment $j_1$: 1.0 (Flow from v to w)+2.0 (Flow from v to u)≤100 aircraft/hr Segment $j_2$: 2.0 (Flow from v to w)+1.0 (Flow from v to u)≤80 aircraft/hr Given a discretization of 5 minutes, the right hand sides of the above node capacity constraints must be divided by 12 to get the equivalent constraint within a 5-minute interval. The resulting mathematical program is shown in FIG. 9.

With regard to the solution approach, since there are an exponentially large number of possible trajectories, column generation is used to solve the problem.

In order to solve the IMP, first solve the linear programming relaxation of the master problem (henceforth referred to as LMP), i.e., the linear program obtained by replacing constraint (8) with the following:

$$x_r \geq 0 \; \forall r \in R \tag{9}$$

An upper bound of 1 is not needed since the variables are implicitly bounded by constraint (5).

Figure 10:
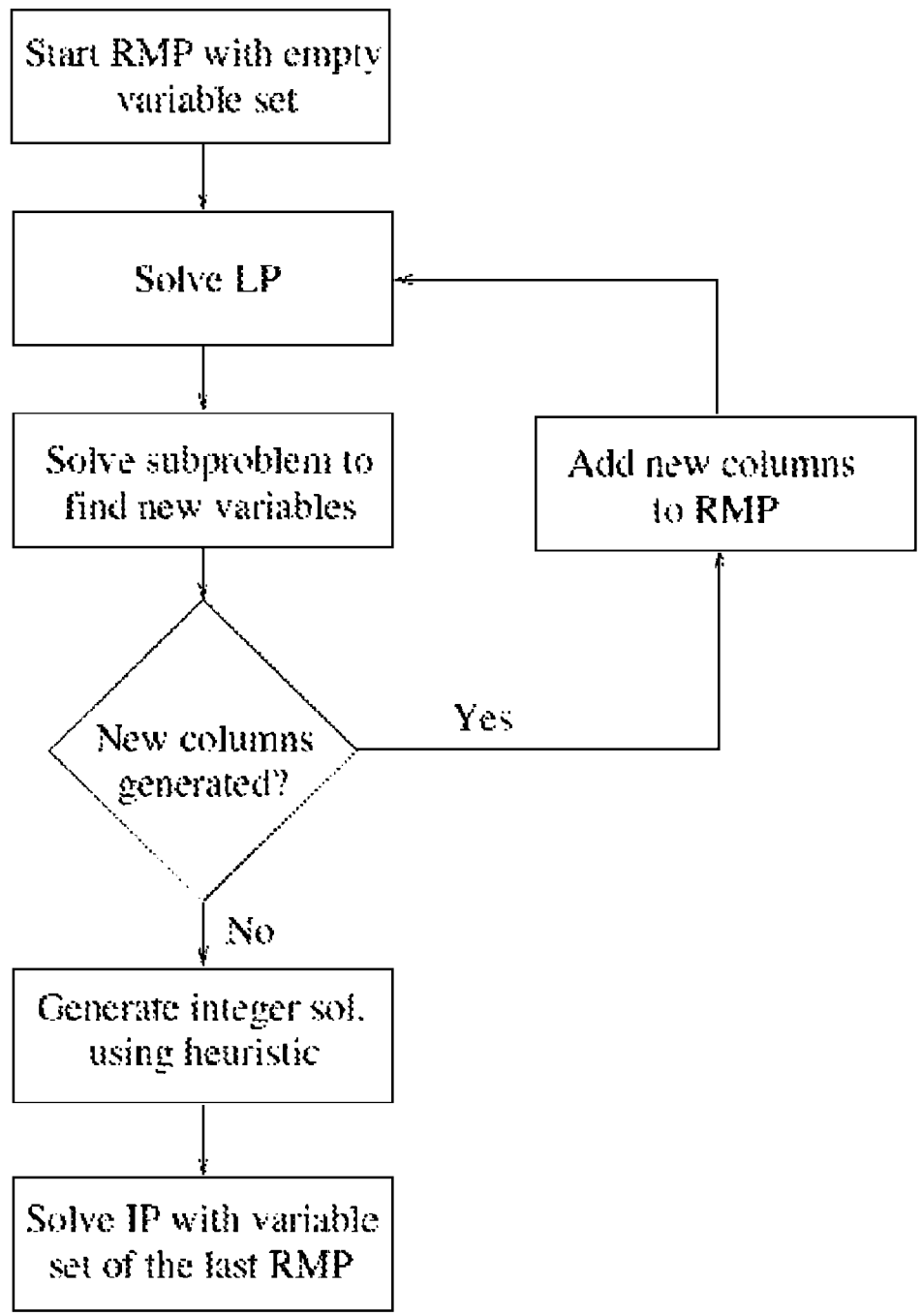
FIG. 10 is a process flow diagram illustrating an example solution process.

In column generation, a restricted master problem (RMP) is solved with a subset of the variables, and the dual values from the solution of the restricted problem is used to identify new variables to add to the RMP. The process terminates when no more variables can be added. Once the LP has been solved to optimality (which gives us an upper bound on the integer solution of the LMP), an integer solution is generated to the problem via a heuristic using the columns of the RMP (which gives a lower bound on the optimal solution of the IMP). Finally, the integer version of the RMP is solved to generate the final solution to the problem. This process is illustrated in FIG. 10. While this process does not necessarily solve the IMP to optimality, the optimality gap is known at termination, and experiments show that the solutions obtained are of very high quality.

With regard to solving the restricted master problem, the restricted master problem is solved using a commercially available linear programming solver. The dual variables from the RMP are denoted as follows.

$\pi_l$ The dual variable for constraint (5) for tail l.

$\lambda_{s,t}$ The dual variable for constraint (6) for sector s at time t.

$\mu_{n,t,j}$ The dual variable for constraint (7) for segment j of the capacity envelope for node n at time t.

With regard to solving the subproblem, given the dual variables of a RMP, a subproblem is solved to identify variables with positive reduced cost that can be added to the RMP (or determine that no such variables exist). Since the subproblems are separable by tail (the only coupling constraints across tails are the capacity constraints, which are accounted for the RMP), a pricing subproblem is solved independently for each tail to identify the best trajectory to add for it (or to determine that no trajectory exists). The subproblem for a tail is equivalent to a longest path problem on a directed acyclic network, and is solved using dynamic programming.

The following notation will be used in describing the subproblem:

$t_{a,f}^{min}$ The minimum transit time (in periods) of flight f on arc a.

$t_{a,f}^{max}$ The maximum transit time (in periods) of flight f on arc a.

$t_{f_1,f_2}^{turn}$ The minimum turnaround time (in periods) between connecting flights $f_1$ and $f_2$.

$\Omega(a, \tau, f)$ The operating cost of flight f on arc a with transit time of $\tau$, which can be any arbitrary function. In experiments, this is modeled as a linear function of $\tau$, with the en-route arcs having the greatest cost, followed by taxi-in/out arcs, followed by ground hold arcs which have the lowest cost. Note that this cost includes the holding/delay cost on each arc. Specifically, for arcs going from the origin to the holding node, this cost represents the cost of ground holding. It is assumed that the operating cost of a trajectory is separable across the arcs, i.e., the total operating cost of a flight equals the sum of operating costs on the arcs.

$\Delta(f,t)$ The total delay cost of flight f arriving at its destination at time t.

The network on which the subproblem is solved is called the space-time network, or ST-network, and includes ST-Nodes, ST-Arcs, and follow rules D1-D5 (defined below).

ST-Nodes are nodes in the space-time network. There is a node for every feasible node-time-flight combination for each tail, which is defined by (n,t,f) representing the node n∈N, time t∈T, and flight f∈T. An ST-Node (n,t,f) exists if and only if one of the following three conditions is satisfied:

Rule D1. n is the origin of f and t is the earliest pushback period for f

Rule D2. n is the destination of f and t is between the earliest and latest arrival times of f Rule D3. n is not an origin or destination and t is between the earliest pushback and latest arrival time of f An arc in the ST-network is directed between two ST-Nodes. An arc exists between two space-time nodes ($n_1$, $t_1$, $f_1$) and ($n_2$, $t_2$, $f_2$) if and only if one of the following two conditions is satisfied:

Rule D4. $a=(n_1, n_2) \in A$ and $f_1=f_2$ and $(n_1, n_2) \in A_F(f_1)$ and $t_{a,f_1}^{min} \leq (t_2-t_1) \leq t_{a,f_1}^{max}$ Rule D5. $a=(n_1,n_2) \in A$ and A connects to $f_2$ and $n_1$ is the destination of $f_1$ and $n_2$ is the origin of $f_2$ and $t_2-t_1 \geq t_{f_1,f_2}^{turn}$ The weight or "length" of an ST-Arc for all turnaround arcs is zero. For all other ST-Arcs from node ($n_1$, $t_1$, f) to ($n_2$, $t_2$, f), the weights are calculated as:

Weight=$R_f$(Benefit, applies only to arcs to the destination of flight f)−

$\Delta(f,t_2)$(Arrival delay cost, applies only to arcs to the destination f)

$\Omega(a,(t_2-t_1),f)$(Operating cost)

$\sum_{j \in J(n_1,t_1)} \sigma_{a,t_1,j} \mu_{n_1,t_1,j} + \sum_{t=t_1}^{t_2-1} \lambda_{s_a,t}$(Dual cost)

Finally, an arc with zero weight from the destination of each flight to a sink is introduced. These arcs allow the creation of partial trajectories where all flights in a tail beyond a certain destination are cancelled. An ST-path can be defined as a path from the origin node of the tail to the sink.

A first lemma of the example approach can be stated as: an ST-path exists if and only if it represents a trajectory that satisfies the operating constraints including minimum and maximum transit times, network connectivity, flight connectivity, turnaround time requirements, and the earliest pushback and latest arrival times of each flight.

The proof follows from construction of the network. To prove the "forward" direction of the statement, i.e., that an ST-path in the network is a feasible 4D-trajectory, observe that Rules D1-3 above impose earliest departure and latest arrival times on the path. Rule D4 restricts the path to belong to $A_F(.)$, which captures aircraft capability constraints and network connectivity requirements. Rule D4 also imposes min and max transit times on all arcs. Rule D5 captures flight connectivity for a tail and imposes restrictions on the turnaround time.

The proof of the "reverse" direction, i.e., that any feasible 4D-trajectory is a path in the network, is by contradiction. Suppose the trajectory of a tail is given by the (node, time, flight) sequence $\{(n_i, t_i, f_i)\}$ that is not represented in the ST-network. Then, (a) there must be a node $(n_j,t_j)$ that is not a node in the ST-network or (b) there must be an arc from $(n_j, t_j, f_j)$ to $(n_{j+1}, t_{j+1}, f_{j+1})$ that is not contained in the ST-network. However, no such node can exist because the network is constructed by exhaustively enumerating all possible node-flight-time combinations and including all nodes that satisfy the constraints. Similarly, no such arc can exist since the set of arcs is constructed by exhaustively examining all possible node combinations and only choosing those that satisfy the constraints. Therefore, the nodes and arcs in the ST-network are actually a superset of the nodes and arcs that are feasible to a 4D-trajectory.

A second lemma of the example approach can be stated as: for a given tail, the weight of an ST-path in the space-time network minus the tail's dual $\pi_t$ equals the reduced cost associated with the corresponding 4D-trajectory.

The reduced cost of the trajectory corresponding to a path is given by:
Reduced cost=Sum of benefits across all flights
  Arrival delay cost
  Operating cost
  Duals of constraints (6)
  Duals multiplied by appropriate coefficient of constraints (7)
  Dual of constraint (5)

The ST-path correctly captures the sum of benefits and arrival delay cost since the benefit $R_f$ and cost $\Delta(f,t)$ of each flight f is accounted for in the arcs entering the destination of the flight, so any path passing through the destination of a flight picks up the benefit and delay cost associated with the flight. The operating costs are accounted for by associating the appropriate $\Omega(.)$ with each arc, and summing along the arcs of the path gives the total operating cost of the trajectory.

The cost of each arc also includes the sum of sector duals $\lambda$ associated with the particular sector-time combination (since the arc-time combination maps to a sector-time combination). The node capacity duals are associated with each ST-node in the path (i.e., the time at which the flight passes through the node) through the product of $\sigma$ and $\mu$ for each segment of the capacity envelope.

The weight of the ST-path therefore contains the benefit, delay cost, and dual costs associated with the capacity constraints. The reduced cost of the 4D-trajectory can thus be obtained by subtracting duals corresponding to the tail constraints (5) from the weight of the ST-path.

A corollary of the example approach can be stated as: a trajectory with strictly positive reduced cost exists if and only if there is a path of length strictly greater than $\pi_t$ in the space-time network.

Thus, in order to determine whether a trajectory exists in each subproblem, solve a longest path problem on the ST-network and identify the 4D-trajectory associated with the longest path. Since the ST-network is a directed acyclic graph (each arc moves forward in time as all transit times are strictly positive), the longest path can be obtained by dynamic programming.

Regarding lower and upper bounds, at any given time, the objective value of the LP of the RMP is a lower bound on the optimal LP value. The reduced costs can be used to calculate an upper bound on the LP, as follows.

It is possible to calculate an upper bound on the LP value after each iteration. Suppose a primal problem (P) and the corresponding dual (D).

(P)
$$\max \sum_i c_i x_i$$

-continued s.t. $\sum_i a_{i,j} x_i \leq b_j \forall j$ $x_i \geq 0 \forall i$ (D)

$$\min \sum_j b_j y_j$$

s.t. $\sum_j a_{i,j} y_j \geq c_i \forall i$ $y_j \geq 0 \forall j$

Once a restricted master problem is solved, values of x and y that are feasible to the above constraints and $\Sigma_i c_i x_i = \Sigma_j b_j y_j$, and (in this case, primal is feasible and bounded, so dual exists and the objective functions of the primal and dual at optimality are equal).

The reduced costs associated with each variable (in the primal) are denoted by $$\phi_i = c_i - \sum_j a_{i,j} y_j,$$

which can be rewritten as $$c_i = \phi_i + \sum_j a_{i,j} y_j.$$

Suppose the value of the optimal LP is z*, then $$z^* = \sum_i c_i x_i^*$$
$$= \sum_i x_i^* \left( \phi_i + \sum_j a_{i,j} y_j \right)$$
$$= \sum_i x_i^* \phi_i + \sum_j y_j \sum_i a_{i,j} x_i^*$$
$$\leq \sum_i x_i^* \phi_i + \sum_j y_j b_j.$$

The value of $\Sigma_j y_j b_j$ is known—it is the value of the current objective function of the RMP. The value of $\Sigma_i x_i^* \phi_i$ can now be bounded as follows: in each sub-problem, the most positive value of reduced cost among all trajectories for a given tail is identified. Let $\phi_t^{max}$ be the largest reduced cost of all trajectories for tail (or zero if the largest reduced cost is non-positive). Since the sum of $x_i$ for a tail is bounded by 1 due to constraint (5), $\Sigma_i x_i^* \leq \Sigma_t \phi_t^{max}$. Thus, after the LP of each RMP has been solved, an upper bound on the optimal LP of the LMP is calculated as the current value of the objective function plus the sum of positive reduced costs across all tails.

The bounds on the LP solution are therefore given by:

Solution to RMP at column generation termination $\leq$ Optimal LP to Master Problem $\leq$ LP upper bound With regard to Solving the IP, once the RMP has been solved to optimality, the IP version of the RMP can be solved, which is obtained by restricting the variables to be binary. While the solution to this IP could, in theory, be far from the optimal solution the IMP, experiments show that solving the IP of the RMP results in high quality solutions that are typically within 1% of the optimal solution to the IMP. To speed up solution of the IP, "seeding" the IP with a feasible solution obtained using a heuristic is performed.

The heuristic proceeds in two stages. In the first stage, each variable is randomly rounded up or down depending on its value as long as it does not violate any constraints. If the value of the variable is $x \in [0, 1]$, the variable is rounded up with probability x and down with probability (1−x). To ensure that variables with a value of zero or one in the LP relaxation have some probability of being rounded, the values of the variables are first truncated to the interval [∈, (1−∈)] so that even variables with a value of 0 or 1 have a probability of ∈ of being rounded away from their LP value. If rounding up a variable causes a constraint to be violated, it is rounded down to zero.

In the second stage, the variables that were not selected in first stage (i.e., that were rounded down) are sorted by decreasing objective function value and greedily rounded up in the sorted order, as long as it does not violate any constraints. The procedure terminates when all variables have been examined.

Since the procedure is random in nature, the heuristic is run multiple times to generate a pool of feasible solutions, and the one with the highest objective value is chosen to seed the IP. While this heuristic is naive, it was not attempted to develop a more sophisticated heuristic as it appears to be very effective at generating high quality solutions with run times that are orders of magnitude less than solving the LP and IP.

The bounds for the optimal IP solution to the Master Problem are

Heuristic *IP* ≤ *IP* solution to *RMP*

≤ Optimal *IP* to Master Problem

≤ Optimal *LP* to Master Problem

≤ *LP* upper bound

In some experiments, the IP gap is reported on, which is calculated as:

$$\text{Gap} = \frac{(LP \text{ upper bound} - IP \text{ solution to } RMP)}{IP \text{ solution to } RMP}.$$

Regarding parallel implementation, since the subproblem time is typically significantly larger than the time to solve the RMP or the final IP, and the subproblem for each tail is independent of other tails, the subproblem computation can be parallelized to significantly reduce run times. The fact that the subproblem is easy to parallelize makes the algorithm extremely scalable. Note that while solving a regular IP can also be parallelized (and is done by commercial solvers), using the parallel implementation makes these algorithms scale predictably with the number of cores.

With regard to stochastic traffic flow management, now described is the approach to solving the traffic flow management in the presence of capacity uncertainty represented via scenario trees, as described above.

The solution to the stochastic case is similar to that of the deterministic case, except that the solution is no longer a simple path through a space-time network, but is instead a tree in a space-time-scenario network.

The notation used in the stochastic case is described below. In general, a "'" is used to distinguish between the stochastic variable/parameter and its deterministic counterpart; for example the decision variable in the stochastic formulation is denoted by x' while that in the deterministic formulation is denoted by x.

G The set of scenarios.

$p_g$ The unconditional probability that scenario g will materialize, i.e., it is the product of the conditional probabilities along the path from the root of the scenario tree to g. For example, in FIG. 7, the unconditional probability of scenario $S_4$ is 0.3×0.4×1.0=0.12.

$T_G(g)$ The set of time periods spanned by scenario g. The start and end times of scenario g are denoted by $t_g^{start}$ and $t_g^{end}$ respectively.

R' Set of all feasible 4-D trajectory trees. Each trajectory tree is tail-specific, and therefore, specifying it implicitly specifies the tail. A trajectory tree could potentially cancel a subset of flights under certain scenarios.

P'(a,t,g) The number of aircraft on arc $a \in A$ at time $t \in T$ during scenario $g \in G$.

Q'(a,t,g) The number of aircraft that enter arc $a \in A$ at time $t \in T$ during scenario $g \in G$.

J'(n,t,g) The set of segments in the capacity envelope of node n at time t during scenario g.

$B'_{s,t,g}$ The capacity of sector s at time t during scenario g.

$D'_{n,t,j,g}$ The right-hand-side of the linear constraint representing segment j of the capacity envelope for node n at time t during scenario g.

$\sigma'_{a,t,j,g}$ The coefficient of arc a in the linear constraint representing segment j of the capacity envelope for the head node of arc a at time t during scenario g.

$a'_{r,t,g}$ The arc that an aircraft following trajectory tree r is on at time t during scenario g.

$R'_L(l)$ The set of trajectory trees of tail £.

$R'_S(s,t,g)$ The set of trajectory trees that intersect with sector capacity constraint of sector s at time t during scenario g.

$R'_N(n, t, j, g)$ The set of trajectories that intersect with segment j of the capacity envelope for node n at time t during scenario g.

$\rho'_r$ The expected benefit (revenue plus cancellation penalties) minus expected costs (operating plus delay) of trajectory tree r.

With regard to the mathematical program, as in the deterministic case, a variable represents whether or not a trajectory tree is selected.

$$x'_r = \begin{cases} 1 & \text{if trajectory tree } r \text{ is chosen, and} \\ 0 & \text{otherwise} \end{cases} \quad (10)$$

$$\forall r \in \mathcal{R}'$$

The Stochastic Integer Master Problem (SIMP) may now be stated as follows.

$$\text{maximize } z = \sum_{r \in \mathcal{R}'} \rho'_r x'_r \quad (11)$$

-continued $$\text{s.t.} \sum_{r \in \mathcal{R}'_L(l)} x'_r \leq 1 \quad (12)$$

$$\forall l \in \mathcal{L}$$

$$\sum_{r \in \mathcal{R}'_S(s,t,g)} x'_r \leq B'_{s,t,g} \forall s \in \mathcal{S}, g \in \mathcal{G}, t \in \mathcal{T}_G(g), \quad (13)$$

$$\sum_{r \in \mathcal{R}'_N(n,t,j,g)} \sigma_{d'_r,t,g,t,j,g} x'_r \leq D'_{n,t,j,g} \quad (14)$$

$$\forall n \in \mathcal{N}, g \in \mathcal{G}, t \in \mathcal{T}_G(g), j \in \mathcal{J}(n, t, g)$$

$$x'_r \in \{0, 1\} \forall r \in \mathcal{R}' \quad (15)$$

Note that this formulation is almost identical to the deterministic formulation, except for the additional scenario index in the constraints. Objective (11) maximizes the total benefit minus cost of all trajectory trees selected. Constraint (12) states that at most one trajectory tree may be selected for each tail. Constraints (13) and (14) are the sector and node capacity constraints respectively.

As in the deterministic case, the linear relaxation of this master problem can be solved using column generation. The linear programming relaxation of the SIMP as SLMP and the restricted master problem is referred to as SRMP.

With regard to solving the subproblem, solving the subproblem is equivalent to solving for a maximum weighted tree in a space-time-scenario network using dynamic programming. Let the duals from the SRMP be denoted as follows.

$\pi'_l$ The dual variable for constraint (12) for tail l.

$\lambda'_{s,t,g}$ The dual variable for constraint (13) for sector s at time t during scenario g.

$\mu'_{n,t,j,g}$ The dual variable for constraint (14) for segment j of the capacity envelope for node n at time t during scenario g.

Figure 11:
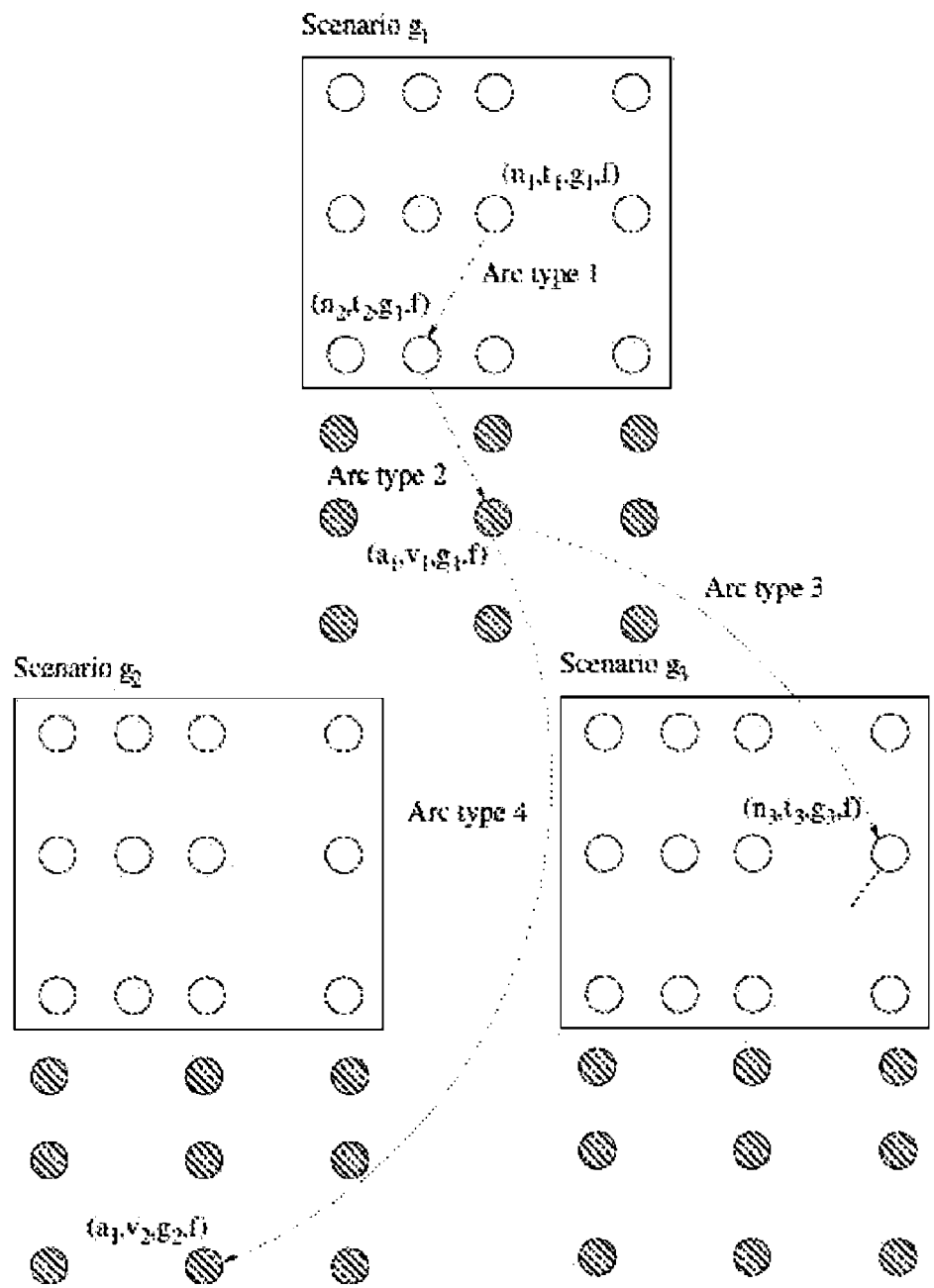
FIG. 11 illustrates the space-time-scenario network for solving an example stochastic subproblem.

With regard to the space-time-scenario network, the space-time-scenario network (henceforth referred to as the STS-network or simply as the network) is shown in FIG. 11. The network has two kinds of nodes:

Node Type 1 nodes are defined by (n, t, f, g) corresponding to flight f reaching node n at time t during scenario g. A Type 1 node (n, t, g, f) exists if at least one of the following conditions hold.

Rule S1. n is the origin of f, t is the earliest pushback period for f, and $t_g^{start} \leq t \leq t_g^{end}$.

Rule S2. n is the destination of f, t is between the earliest and latest arrival times of f, and $t_g^{start} \leq t \leq t_g^{end}$.

Rule S3. n is not an origin or destination, t is between the earliest pushback and latest arrival time of f, and $t_g^{start} \leq t \leq t_g^{end}$.

Node Type 2 nodes are defined by (a, v, f, g) corresponding to flight f that is on arc a, having spent time v on the arc at the end of scenario g. These nodes capture time spent that an aircraft has spent on an arc at the time of a scenario transition. A Type 2 node (a, v, g, f) exists if the following condition holds.

Rule S4. The head of arc a has a Type 1 node in scenario g and v is between 0 and $t_{a,f}^{max}$, the max transit time of flight f on arc a.

The network has four kinds of arcs that connect each of the two types of nodes to each other.

Arc Type 1 arcs are from a Type 1 node to another Type 1 node. For example, in FIG. 11, the Type 1 arc represents a movement of flight f from node $n_1$ at time $t_1$ to node $n_2$ at time $t_2$ during scenario $g_1$. Let $a \in A$ denote the arc in the network from $n_1$ to $n_2$. A Type 1 arc from $(n_1, t_1, g_1, f_1)$ to $(n_2, t_2, g_2, f_2)$ exists if one of the following conditions hold.

Rule S5. $g_1 = g_2$ and $a = (n_1, n_2) \in A$ and $f_1 = f_2$ and $a \in A_F(f)$ and $t_{a,f}^{min} \leq (t_2 - t_1) \leq t_{a,f}^{max}$.

Rule S6. $g_1 = g_2$ and $a = (n_1, n_2) \in A$ and $f_1 \neq f_2$ and $f_1$ connects to $f_2$ and $n_1$ is the destination of $f_1$ and $n_2$ is the origin of $f_2$ and $t_2 - t_1 \geq t_{f_1,f_2}^{turn}$.

The weight of a Type 1 Arc for all turnaround arcs is zero. For all other arcs from $(n_1, t_1, g, f)$ to $(n_2, t_2, g, f)$, weights are calculated as:

$$\text{Weight} = p_g R_f \text{ (Benefit, only for arcs to the destination of } f\text{)} -$$

$$p_g \Delta(f, t_2) \text{ (Arrival delay cost, only for arcs to destination of } f\text{)} -$$

$$p_g \Omega(a, (t_2 - t_1), f) \text{ (Operating cost)}$$

$$\sum_{j \in \mathcal{J}(n_1,t_1,g)} \sigma_{a,t_1,j,g} \mu_{n_1,t_1,j,g} + \sum_{t=t_1}^{t_2-1} \lambda_{s_a,t,g} \text{ (Dual cost)}$$

Note that all non-dual costs are multiplied by the probability of the scenario, so that their summation will be the expected cost.

Arc Type 2 arcs are from a Type 1 node to a Type 2 node. For example, in FIG. 11, the Type 2 arc implies that flight f arrived at node $n_2$ at time $t_2$ during scenario $g_1$, and left node $n_2$ along arc $a_1$; at the end of the scenario, the aircraft had spent $v_1$ periods on the arc. A Type 2 arc from $(n, t, g_1, f_1)$ to $(a, v, g_2, f_2)$ exists if one of the following conditions hold.

Rule S7. $g_1 = g_2$ and n is the head of arc a and $f_1 = f_2$ and $a \in A_F(f)$ and the time spent on the arc $v = t_g^{end} - t$ and $0 \leq v \leq t_{a,f}^{max}$.

Rule S8. $g_1 = g_2$ and n is the head of arc a and $f_1 \neq f_2$ and $a \in A_F(f)$ and the time spent on the arc $v = t_g^{end} - t$ and $0 \leq v \leq$ (earliest departure of $f_2$ − earliest arrival of $f_1$).

The weight of a Type 2 Arc for all turnaround arcs is zero. For all other arcs from $(n, t_1, g, f)$ to $(a, v, g, f)$, weights are calculated as:

$$\text{Weight} = p_g \Omega(a, v, f) \text{ (Operating cost)} -$$

$$\sum_{j \in \mathcal{J}(n,t_1,g)} \sigma_{a,t_1,j,g} \mu_{n,t_1,j,g} + \sum_{t=t_1}^{t_g^{end}} \lambda_{s_a,t,g} \text{ (Dual cost)}$$

Note that these arcs are not associated with any benefit or delay costs since those are assessed only for arcs going into a destination Type 1 node.

Arc Type 3 arcs are from a Type 2 node to a Type 1 node. For example, in FIG. 11, the Type 3 arc implies that at the end of scenario $g_2$, flight f had spent $v_1$ periods on the arc $a_1$. The aircraft then arrived at node $n_3$ at time $t_3$ during scenario $g_3$, where $g_3$ is a child of scenario $g_1$ in the scenario tree. A Type 3 arc from $(a, v, g_1, f_1)$ to $(n, t, g_2, f_2)$ exists if one of the following conditions hold.

Rule 9. $g_1$ is the parent scenario of $g_2$ and n is the tail of arc a and $f_1 = f_2$ and $a \in A_F(f)$ and the total time spent on the arc $(v + t - t_{g_1}^{end})$ is between $t_{a,f}^{min}$ and $t_{a,f}^{max}$.

Rule 10. $g_1$ is the parent scenario of $g_2$ and n is the tail of arc a and $f_1 \neq f_2$ and $a \in A_F(f)$ and the total time spent on the arc $(v+t-t_{g_1}^{end})$ is between $t_{f_1,f_2}^{turn}$ and (earliest departure of $f_2$-earliest arrival of $f_1$).

The weight of a Type 3 Arc for all turnaround arcs is zero. For all other arcs from (a, v, $g_1$, $f_1$) to (n, t, $g_2$, $f_2$), weights are calculated as:

Weight = $p_{g_2} R_f$ (Benefit, applies only to arcs to the destination of flight $f$) –

$p_{g_2} \Delta(f, t_2)$(Arrival delay cost, applies only to arcs to the destination of flight $- p_{g_2}(\Omega(a, (v+t_2-t_{g_1}^{end}), f) - \Omega(a, v, f))$ (Incremental operating cost) $- \sum_{t=t_{g_1}^{end}+1}^{t_2-1} \lambda_{s_G,t,g_2}$ (Dual cost)

Note that there are no node capacity dual costs associated with these arcs since those are assessed only if the arc is from a Type 1 node.

Arc Type 4 arcs are from a Type 2 node to another Type 2 node. For example, in FIG. 11, the Type 4 arc implies flight f was on arc $a_1$ at the end of scenario $g_1$ having spent $v_1$ periods on the arc; it then continued on the same arc for the duration of the scenario $g_2$, and at the end of scenario $g_2$ had spent $v_2$ time periods on it. (Thus, $(v_2-v_1)$ is the duration of scenario $g_2$. A Type 4 arc from $(a_1, v_1, g_1, f_1)$ to $(a_2, v_2, g_2, f_2)$ exists if the following condition holds:

Rule 11. $g_1$ is the parent scenario of $g_2$ and $f_1=f_2$ and $a_1=a_2$ and $v_2=(v_1+t_{g_2}^{end}-t_{g_1}^{end})$.

The weight of a Type 4 Arc for all turnaround arcs is zero. For all other arcs from (a, $v_1$, $g_1$, f) to (a, $v_2$, $g_2$, f), weights are calculated as Weight = $-p_{g_2}(\Omega(a, v_2, f) - \Omega(a, v_1, f))$(Incremental operating cost) $-$ $\sum_{t=t_{g_1}^{end}+1}^{t_{g_2}^{end}} \lambda_{s_G,t,g_2}$ (Dual cost)

Finally, arcs are added from each Type 1 node that is a flight destination to a sink (that would represent a cancellation of subsequent flights); note that these arcs could be used only for certain scenarios, so the solution could potentially cancel some flights under some scenarios and not others.

Collectively, the four arcs in FIG. 11 would represent the following events. Flight f arrives at node $n_1$ at time $t_1$ during scenario $g_1$. It then proceeds to node $n_2$ at time $t_2$ during the same scenario. It then leaves $n_2$, proceeding along arc $a_1$. At the end of scenario $g_1$, the aircraft had spent $v_1$ time periods on the arc. At that time, if scenario $g_2$ unfolds, the aircraft stays on the arc until the end of scenario $g_2$, at the end of which it would have spent $v_2$ time periods on the arc. If scenario $g_3$ unfolds, the aircraft proceeds to node $n_3$, reaching it at time $t_3$.

The rationale for creating such a network representation is that the Type 2 nodes represent the points at which new scenarios materialize, and therefore represent branching locations in the trajectory tree while the Type 1 nodes represent deterministic decisions that take place within a scenario. Define a space-time-scenario forest (henceforth referred to as an STS-forest) as a forest (a collection disjoint trees) in the space-time-scenario network with the following properties.

Property 1. Every Type 1 node that is the origin of the first flight in the tail is a root of a tree in the STS-forest (i.e., it does not have a parent node). This property ensures that a decision is made for the origin node of a tail for all scenarios that contain the earliest departure time of the first flight of the tail. A tree is allowed to contain just the root node, in which case the interpretation for the singleton root is that all flights in the tail are cancelled in the scenario containing this root.

Property 2. Every non-root Type 1 node has a parent if and only if it has a child, except for nodes that correspond to the destination of a flight, which can have a parent without having a child. This property ensures continuity of the flight if the node is not a destination; if a flight arrives at a node, it must depart from it. If the node represents the destination of a flight but does not have children, the interpretation is that all subsequent connecting flights are cancelled in the scenario that contains the node.

Property 3. Every Type 2 node has children if and only if it has a parent. This property ensures that Type 2 nodes cannot be the root or the leaves of a tree; if they belong to a tree, then they must have a parent as well as children.

Property 4. Each Type 2 node in scenario g that has a parent must have a child in every scenario that is a child of g in the scenario tree. This property ensures that there is a decision that is made for every possible realization of scenarios that occur at the end of g, and that a flight never gets "stranded" at the end of a scenario without guidance on where it should proceed next.

Define the weight of a forest to be the sum of arc weights of all the arcs in the forest minus the dual $\pi'_l$ for tail l. The maximum weight STS-forest is defined as an STS-forest with the largest weight of all STS-forests.

Define the weight of a subtree (a connected subset of a tree) to be the sum of arc weights in the tree.

A lemma of the example approach can be stated as: an STS-forest in the space-scenario-time network exists if and only if it represents a trajectory tree that satisfies the operating constraints including minimum and maximum transit times, network connectivity, flight connectivity, turnaround time requirements, and the earliest pushback and latest arrival time constraints of each flight.

The proof follows from construction of the network.

To prove the "forward" direction of the statement, i.e., that an STS-forest in the network is a feasible 4D-trajectory tree, observe that Rules S1-S3 above impose earliest departure and latest arrival times on the path, and also accounts for mapping time periods to scenarios. The arc rules require that all arcs belong to $A_F(f)$, and that the origin of a flight must be preceded by the destination of the previous flight. Thus, all network connectivity and flight connectivity constraints are accounted for in the network. It is only needed to be shown that a trajectory tree satisfies min and max transit times. If both end points of an arc are Type 1 nodes, then the transit times are valid by construction (per Rule S5). It is only needed to be shown that the transit time constraints between two nodes are satisfied even when the path passes through a Type 2 node. Consider a sequence starting at a Type 1 node, passing through one or more Type 2 nodes and ending at a Type 1 node, represented by $(n_1, t_1, g_1, f)$, $(a, v_1, g_1, f)$, $(a, v_2, g_2, f)$, ..., $(n_2, t_2, g_{k+1}, f)$. It needs to be shown that that $t_{a,f}^{min} \leq (t_2-t_1) \leq t_{a,f}^{max}$. Considering the last and penultimate scenarios, the time spent on the arc is given by the time spent on the arc until the penultimate scenario $v_k$ plus the additional time spent in the last scenario $(t_2-t_{g_k}^{end})$. Let $\theta=v_k+(t_2-t_{g_k}^{end})$ represent the time spent on the arc. Then, by Rule 9, $t_{a,f}^{min} \leq \theta \leq t_{a,f}^{max}$. Also, $\theta$ can be written as follows:

$$\theta = v_k + t_2 - t_{g_k}^{end}$$

$$= v_{k-1} + t_{g_k}^{end} - t_{g_{k-1}}^{end} + t_2 - t_{g_k}^{end}$$

(Expanding $v_k$ using Rule 9)

$$= v_{k-2} + t_{g_{k-1}}^{end} - t_{g_{k-2}}^{end} + t_{g_k}^{end} - t_{g_{k-1}}^{end} + t_2 - t_{g_k}^{end}$$

(Expanding $v_{k-1}$ using Rule 9)

$$= \ldots \text{ (Iteratively expanding } v \text{ and canceling terms)}$$

$$= v_1 - t_{g_1}^{end} + t_2$$

$$= -t_1 + t_2 \quad \text{(By Rule S7)}$$

Thus, it is shown that $\theta=(t_2-t_1)$ and $t_{a,f}^{min} \leq \theta \leq t_{a,f}^{max}$. Therefore, the construction of the STS-network preserves min and max transit times.

The proof of the "reverse" direction, i.e., that any feasible 4D-trajectory tree is an STS-forest in the network, is by contradiction. If there exists a 4D-trajectory tree that does not have an equivalent STS-forest in the network. Then, there exists a node-time-scenario combination that does not exist in the network or that there is no arc in the network between two nodes in the 4D-trajectory tree. However, no such node or arc can exist since the construction of the network exhaustively examines all node-time-scenario combinations to generate the nodes, and then examines all possible combinations of nodes to create arcs between them. The set of nodes and arcs in the STS-network is actually a superset of nodes and arcs that are feasible to a trajectory tree.

A second lemma of the example approach can be stated as: the weight of an STS-forest in the space-time-scenario network minus the tail's dual $\pi'_l$ equals the reduced cost of the corresponding 4D-trajectory tree.

The reduced cost of a 4D-trajectory corresponding is given by

Reduced cost=Sum of benefits across all flights in the tail
  Arrival delay cost
  Operating cost
  Duals of constraints (13)
  Duals multiplied by appropriate coefficient of constraints (14)
  Dual of constraint (12)

The STS-path correctly captures the expected benefits and arrival delay cost since the expected benefit $p_g R_f$ and cost $p_g \Delta(f,t)$ of each flight f and scenario g is accounted for in the arcs entering the destination of the flight of each scenario, so any path passing through the destination of a flight picks up the benefit and delay cost associated with the flight. The operating costs are accounted for by associating the appropriate $p_g \Omega(.)$ with each arc, and summing along the arcs of the forest gives the total expected operating cost of the trajectory tree.

The cost of each arc also includes the sum of sector duals A associated with the particular sector-time-scenario combination (since the arc-time-scenario combination maps to a sector-time-scenario combination for all four types of arcs). The node capacity duals are associated with each Type 1 node in the path (and are accounted for in each Type 1 and 2 arcs) through the product of $\alpha$ and $\mu$ for each segment of the capacity envelope in each scenario.

The weight of the ST-path contains the benefit, delay cost, and dual costs associated with the capacity constraints. The reduced cost of the 4D-trajectory tree can thus be obtained by subtracting $\pi'_l$, the duals corresponding to the tail constraints (12), from the weight of the ST-path.

A corollary of the example approach can be stated as: a trajectory with positive reduced cost exists if and only if there is an STS-forest of weight strictly greater than $\pi'_l$ in the space-time network.

A dynamic programming algorithm as described below can be used to compute a maximum weight STS-forest. Let $J_1(n, t, g, f)$ be the weight of a subtree rooted at a Type 1 node (n, t, g, f), and $J_2(a, v, g, f)$ be the weight of a subtree rooted at a Type 2 node (a, v, g, f). All nodes in the subtree other than the root satisfy Properties 1-4 since it is a subtree of a valid STS-forest; the root satisfies the properties only if it is an origin of the tail. The weight of a subtree rooted at a node is also referred to as the label of that node.

In order to simplify the description of the DP, introduced is the following notation. Any space-time-scenario node is referred to simply as a node; this could be either a Type 1 or Type 2 node.

$G^+(u)$ The set of child scenarios of the scenario containing node u.

$V_1^+(u,g)$ The set of Type 1 nodes adjacent to node u in scenario g, i.e., there is an arc from u to each node $v \in V_1^+(u,g)$. If the scenario is not explicitly specified, $V_1^+(u,.)$ represents the set of Type 1 nodes within the same scenario as u respectively.

$V_2^+(u,g)$ The set of Type 2 nodes adjacent to node u in scenario g, i.e., there is an arc from u to each node $v \in V_2^+(u,g)$. If the scenario is not explicitly specified, $V_2^+(u,.)$ represents the set of Type 2 nodes within the same scenario as u respectively.

$\omega_{u,v}$ The weight of the arc form u to v.

FDEST(l) The set of STS-nodes that correspond to the destination nodes of flights belonging to tail l.

TDEST(l) The set of STS-nodes that correspond to the destination nodes of the last flight of tail l.

The dynamic program performs the following recursions:

$$J_2^*(u) = \sum_{g \in G^+(u)} \max \left\{ \max_{v \in V_1^+(u,g)} \{J_1^*(v) + \omega_{u,v}\}, \max_{v \in V_2^+(u,g)} \{J_2^*(v) + \omega_{u,v}\} \right\} \quad (16)$$

Equation (16) calculates the max weight subtree rooted at a Type 2 node by finding the best adjacent node in each of the scenario's children, and summing across these nodes.

$$J_1^*(u) = \max \left\{ \max_{v \in V_1^+(u,.)} \{J_1^*(v) + \omega_{u,v}\}, \max_{v \in V_2^+(u,.)} \{J_2^*(v) + \omega_{u,v}\} \right\} \quad (17)$$

$$\forall u \notin FDEST(f)$$

Equation (17) states that the maximum-weight subtree rooted at a Type 2 node u is the maximum over all outgoing adjacent nodes v of the weight of arc (u,v) plus the maximum weight subtree rooted at node v.

$$J_1^*(u) = \max \left\{ 0, \max_{v \in V_1^+(u,.)} \{J_1^*(v) + \omega_{u,v}\}, \max_{v \in V_2^+(u,.)} \{J_2^*(v) + \omega_{u,v}\} \right\} \quad (18)$$

$$\forall u \in FDEST(f)$$

Equation (18) is similar to the previous equation, except that it allows for the label of a destination of a flight to be zero; the interpretation of this is that the destination does not have any positive weight subtrees below it, which implies that all subsequent flights below that node are cancelled.

$$J^*_1(u)=0 \forall u \in TDEST(l) \quad (19)$$

$$J^*_1(u)=-\infty \forall u \notin TDEST(l) \quad (20)$$

Equations (19) and (20) impose the boundary condition is that the weight of the subtree rooted at the destination of the tail is zero (for all scenarios where this node exists), and the initial weights of all other nodes is a large negative number.

The pseudocode for the dynamic programming algorithm is illustrated in FIG. 12.

A theorem of the example approach can be stated as: the algorithm described in FIG. 12 and Equations (16)-(19) correctly compute the weight of the maximum weight STS-forest.

A proof of the example approach can be stated as: first, observe that the boundary conditions in Equations (19) and (20) are correct since the subtree below the destinations are empty, and therefore have zero weight. The correctness of recursion in Equation (17) is proved by the properties of longest paths on directed acyclic graphs, and is not described here. Equation 18 follows from the correctness of longest paths in acyclic networks and the option available at destinations nodes to allow cancellations (i.e., have an empty subtree rooted at the destination with zero weight).

The correctness of Equation 16 is now proven by contradiction. Suppose the labels of $J^*(v)$ are correct for all v until a particular iteration and there exists some u such that $$J^*_2(u) > \sum_{g \in G^+(u)} \max\left\{ \max_{v \in V^+_1(u,g)} \{J^*_1(v) + \omega_{u,v}\}, \max_{v \in V^+_2(u,g)} \{J^*_2(v) + \omega_{u,v}\} \right\} \quad (21)$$

Given that the weight of the optimal subtree rooted at u has value $J^*_2(u)$, the values of the labels of the children of u in the tree can be calculated as $J^*_2(u)-w_{u,v}$ for all children v in the optimal subtree. This implies that there exists some v such that $J^*_2(u)-w_{u,v} > J^*_1(v)$ or $J^*_2(u)-w_{u,v} > J^*_2(V)$ for Equation (21) to be valid. However, this violates the assumption of the optimality of all labels of v.

Given that the recursions work assuming all iterations up until that point have computed the correct labels, and that the boundary conditions are accurate, it can be concluded that the recursions accurately calculate the labels of all nodes.

With regards to bounds, apart from the difference in the subproblem, the rest of the procedure is identical to the deterministic case. The bounds derived above still hold since any specific assumptions about the deterministic case were not made. The column generation process terminates when the gap is within a specified threshold.

The two-stage heuristic described above and the bounds are applicable to the stochastic case since no assumption was made in the heuristic that was specific to the deterministic formulation.

The subject matter described herein provides many technical advantages. For example, even when projected capacities are known with perfect foresight, the current subject matter provides a computationally efficient solution to determining trajectories for a large number of aircraft and may be used in real systems. For example, in some implementations, trajectories may be computed for tens to hundreds of thousands of aircraft on the order of minutes. In addition, when projected capacity is uncertain, some implementations of the current subject matter can solve large-scale uncertain-capacity problems with 5-10 minutes.

Although a few variations have been described in detail above, other modifications or additions are possible. For example, in some implementations, the current subject matter can provide guarantees about the quality of the output (e.g., if the processes are run for only one minute, the processes with generate a solution and an associated bound on how far from an optimal solution the provided solution is, for example, the provided solution may be no more than 25% worse than the best possible solution).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by at least one data processor forming part of at least one computing system, the method comprising:
   first determining a price to utilize each of a plurality of air-traffic resources using data characterizing a projected capacity for each of a plurality of air-traffic resources, the plurality of air-traffic resources including predefined geographic locations and future time periods designated as available for use, the projected capacity for each of the plurality of air-traffic resources characterizing a maximum number of aerial vehicles allowed to utilize the air-traffic resource as a function of time, the price for a given air-traffic resource based on the projected capacity of the given air-traffic resource;
   first transmitting data comprising the determined price to each of a plurality of distributed computing systems to enable each of the distributed computing systems to independently determine, based on the price, proposed trajectories for one or more of the plurality of aerial vehicles;
   first receiving, from the plurality of distributed computing systems, data characterizing the proposed trajectories;
   second determining, using the proposed trajectories, whether the capacity required by the proposed trajectories in aggregate exceed the projected capacity for each of the plurality of air-traffic resources;
   third determining an updated price to utilize each of the plurality of air-traffic resources, the updated price for at least one of the air-traffic resources increasing when the proposed trajectories in combination exceed the projected capacity of the at least one of the air-traffic resources; and
   second transmitting data comprising the determined updated price to each of the plurality of distributed computing systems to enable each of the distributed computing systems to independently determine, based on the updated price, updated proposed trajectories for one or more of the plurality of aerial vehicles
      wherein one or more of the first determining, first transmitting, first receiving, second determining, third determining, and second transmitting are performed using at least one data processor.

2. The method of claim 1, wherein each proposed trajectory is determined by one of the plurality of distributed data processors independently from other trajectories.

3. The method of claim 1, further comprising:
   determining, using at least one data processor, whether the proposed trajectories satisfy a criterion characterizing an optimal solution.

4. The method of claim 3, further comprising:
   iteratively third determining the updated price, second transmitting the updated price to the plurality of the distributed computing systems, and second receiving the proposed trajectories until the proposed trajectories satisfy the criterion or until execution of a predetermined number of iterations.

5. The method of claim 1, further comprising:
   associating, with each air-traffic resource, an uncertainty in capacity as a function of time, the uncertainty in capacity characterizing a variability of the maximum number of aerial vehicles allowed to utilize the air-traffic resource as a function of time;
   generating, using the uncertainty in capacity for each air-traffic resource, a scenario tree characterizing possible scenarios and a likelihood of each of the possible scenarios occurring, each of the possible scenarios describing potential future capacity of the air-traffic resources according to a realization of uncertainty, the potential future capacity is of the air-traffic resources for the predefined geographic locations and the future time periods;
   wherein the price is determined for each air-traffic resource and each scenario in the scenario tree.

6. The method of claim 5, further comprising:
   receiving, from each of the plurality of distributed computing systems, a trajectory tree characterizing multiple possible geographic locations of one of the plurality of aerial vehicles at each of the future time periods corresponding to each possible scenario, the trajectory tree further characterizing actions for the one of the plurality of aerial vehicles to perform according to the realization of uncertainty.

7. The method of claim 5 wherein the uncertainty in capacity as a function of time is determined based on data received from an external source, the data including one or more of weather observations, weather forecasts, flight schedules, flight statuses, operational constraints, traffic management initiatives, and initial flight plans.

8. The method of claim 1 wherein the plurality of air-traffic resources are represented by nodes, arcs, and sectors,
the nodes corresponding to a region in airspace or a decision point;
the arcs connecting nodes and corresponding to a positive minimum transit time, maximum transit time, and cost as a function of transit time; and
each sector corresponding to a contiguous region of airspace and fully including one or more arcs.

9. The method of claim 1, wherein the price is a non-monetary characterization of an over-utilization or an under-utilization of a given air-traffic resource.

10. A non-transitory computer program product storing instructions, which when executed by at least one data processor of at least one computing system, implement a method comprising:
first determining a price to utilize each of a plurality of air-traffic resources using data characterizing a projected capacity for each of a plurality of air-traffic resources, the plurality of air-traffic resources including predefined geographic locations and future time periods designated as available for use, the projected capacity for each of the plurality of air-traffic resources characterizing a maximum number of aerial vehicles allowed to utilize the air-traffic resource as a function of time, the price for a given air-traffic resource based on the projected capacity of the given air-traffic resource;
first transmitting data comprising the determined price to each of a plurality of distributed computing systems to enable each of the distributed computing systems to independently determine, based on the price, proposed trajectories for one or more of the plurality of aerial vehicles;
first receiving, from the plurality of distributed computing systems, data characterizing the proposed trajectories;
second determining, using the proposed trajectories, whether the capacity required by the proposed trajectories in aggregate exceed the projected capacity for each of the plurality of air-traffic resources;
third determining an updated price to utilize each of the plurality of air-traffic resources, the updated price for at least one of the air-traffic resources increasing when the proposed trajectories in combination exceed the projected capacity of the at least one of the air-traffic resources; and
second transmitting data comprising the determined updated price to each of the plurality of distributed computing systems to enable each of the distributed computing systems to independently determine, based on the updated price, updated proposed trajectories for one or more of the plurality of aerial vehicles
wherein one or more of the first determining, first transmitting, first receiving, second determining, third determining, and second transmitting are performed using at least one data processor.

11. The computer program product of claim 10, wherein each proposed trajectory is determined by one of the plurality of distributed data processors independently from other trajectories.

12. The computer program product of claim 10, the method further comprising:
determining, using at least one data processor, whether the proposed trajectories satisfy a criterion characterizing an optimal solution.

13. The computer program product of claim 12, the method further comprising:
iteratively third determining the updated price, second transmitting the updated price to the plurality of the distributed computing systems, and second receiving the proposed trajectories until the proposed trajectories satisfy the criterion or until execution of a predetermined number of iterations.

14. The computer program product of claim 10, the method further comprising:
associating, with each air-traffic resource, an uncertainty in capacity as a function of time, the uncertainty in capacity characterizing a variability of the maximum number of aerial vehicles allowed to utilize the air-traffic resource as a function of time;
generating, using the uncertainty in capacity for each air-traffic resource, a scenario tree characterizing possible scenarios and a likelihood of each of the possible scenarios occurring, each of the possible scenarios describing potential future capacity of the air-traffic resources according to a realization of uncertainty, the potential future capacity is of the air-traffic resources for the predefined geographic locations and the future time periods;
wherein the price is determined for each air-traffic resource and each scenario in the scenario tree.

15. The computer program product of claim 14, the method further comprising:
receiving, from each of the plurality of distributed computing systems, a trajectory tree characterizing multiple possible geographic locations of one of the plurality of aerial vehicles at each of the future time periods corresponding to each possible scenario, the trajectory tree further characterizing actions for the one of the plurality of aerial vehicles to perform according to the realization of uncertainty.

16. The computer program product of claim 14 wherein the uncertainty in capacity as a function of time is determined based on data received from an external source, the data including one or more of weather observations, weather forecasts, flight schedules, flight statuses, operational constraints, traffic management initiatives, and initial flight plans.

17. The computer program product of claim 10 wherein the plurality of air-traffic resources are represented by nodes, arcs, and sectors,
the nodes corresponding to a region in airspace or a decision point;
the arcs connecting nodes and corresponding to a positive minimum transit time, maximum transit time, and cost as a function of transit time; and
each sector corresponding to a contiguous region of airspace and fully including one or more arcs.

18. The computer program product of claim 10, wherein the price is a non-monetary characterization of an over-utilization or an under-utilization of a given air-traffic resource.

19. A system comprising:
at least one data processor;
memory storing instructions which, when executed by the at least one data processor, causes the at least one data processor to perform operations comprising:
first determining a price to utilize each of a plurality of air-traffic resources using data characterizing a projected capacity for each of a plurality of air-traffic resources, the plurality of air-traffic resources including predefined geographic locations and future time periods designated as available for use, the projected capacity for each of the plurality of air-traffic resources characterizing a maximum number of aerial vehicles allowed to utilize the air-traffic resource as a function of time, the price for a given air-traffic resource based on the projected capacity of the given air-traffic resource;
first transmitting data comprising the determined price to each of a plurality of distributed computing systems to enable each of the distributed computing systems to independently determine, based on the price, proposed trajectories for one or more of the plurality of aerial vehicles;
first receiving, from the plurality of distributed computing systems, data characterizing the proposed trajectories;
second determining, using the proposed trajectories, whether the capacity required by the proposed trajectories in aggregate exceed the projected capacity for each of the plurality of air-traffic resources;
third determining an updated price to utilize each of the plurality of air-traffic resources, the updated price for at least one of the air-traffic resources increasing when the proposed trajectories in combination exceed the projected capacity of the at least one of the air-traffic resources; and
second transmitting data comprising the determined updated price to each of the plurality of distributed computing systems to enable each of the distributed computing systems to independently determine, based on the updated price, updated proposed trajectories for one or more of the plurality of aerial vehicles
wherein one or more of the first determining, first transmitting, first receiving, second determining, third determining, and second transmitting are performed using at least one data processor.

20. The system of claim 19, wherein each proposed trajectory is determined by one of the plurality of distributed data processors independently from other trajectories.

* * * * *